(12) United States Patent
Nakrani et al.

(10) Patent No.: US 9,060,009 B2
(45) Date of Patent: Jun. 16, 2015

(54) NETWORK-EXTENDED DATA STORAGE FOR MOBILE APPLICATIONS

(75) Inventors: Niraj R. Nakrani, Bangalore Karnataka (IN); Pandey Arun, Bangalore Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 736 days.

(21) Appl. No.: 13/382,600

(22) PCT Filed: Jul. 7, 2009

(86) PCT No.: PCT/US2009/049836
§ 371 (c)(1),
(2), (4) Date: Jun. 1, 2012

(87) PCT Pub. No.: WO2011/005251
PCT Pub. Date: Jan. 13, 2011

(65) Prior Publication Data
US 2013/0029652 A1   Jan. 31, 2013

(51) Int. Cl.
*H04M 3/00* (2006.01)
*H04L 29/08* (2006.01)
*H04W 24/00* (2009.01)

(52) U.S. Cl.
CPC .......... *H04L 67/1097* (2013.01); *H04W 24/00* (2013.01)

(58) Field of Classification Search
USPC .......... 455/435.1, 418, 403, 436, 406, 414.1, 455/419; 709/223
See application file for complete search history.

(56) References Cited

U.S. PATENT DOCUMENTS

| 6,779,030 B1 * | 8/2004 | Dugan et al. ................. 709/223 |
| 7,209,964 B2 * | 4/2007 | Dugan et al. ................. 709/223 |
| 2002/0083160 A1 | 6/2002 | Middleton |

(Continued)

FOREIGN PATENT DOCUMENTS

| KR | 10-2001-0003135 A | 1/2001 |
| KR | 10-2005-0048109 A | 5/2005 |

OTHER PUBLICATIONS

Notification of Transmittal of the International Search Report and the Written Opinion of the International Searching Authority, or the Declaration, Hewlett-Packard Development Company, L.P., International Application No. PCT/US2009/049836 filed Jul. 7, 2009, Date of Completion: Mar. 15, 2010, Date of Mailing: Mar. 16, 2010, pp. 1-11.

*Primary Examiner* — Joseph Arevalo
(74) *Attorney, Agent, or Firm* — Norton Rose Fulbright US LLP

(57) ABSTRACT

Embodiments of the present invention are directed to methods and subsystems directed to increasing the amount of memory accessible to software and hardware components of mobile electronic devices as well as to increasing security and reliability of data storage for mobile electronic devices. In the described embodiments of the present invention, the local memory within a mobile electronic device is extended by transmitting data from the local memory to one or more remote computer systems for storage and by requesting and receiving data from the one or more remote computer systems for storage in the local memory of the mobile electronic device. In the described embodiments of the present invention, a portion of the local memory within a mobile electronic device is employed as a local window into a much larger amount of data stored on one or more remote computer systems on behalf of the mobile electronic device.

18 Claims, 18 Drawing Sheets

(56) References Cited

U.S. PATENT DOCUMENTS

| | | |
|---|---|---|
| 2004/0249797 A1 | 12/2004 | Jarvinen et al. |
| 2005/0021713 A1* | 1/2005 | Dugan et al. .................. 709/223 |
| 2005/0044081 A1 | 2/2005 | Ferguson et al. |
| 2009/0132410 A1* | 5/2009 | Penney et al. ................... 705/37 |
| 2012/0185361 A1* | 7/2012 | Demirjian ................. 705/26.81 |

* cited by examiner

NETWORK-EXTENDED DATA STORAGE FOR MOBILE APPLICATIONS

BACKGROUND OF THE INVENTION

Mobile electronic devices are perhaps evolving more quickly than any other segment of technology, and have the potential for eventually replacing personal computers and other, older digital technologies and devices. Many currently available cellular telephones include multiple high-computational-bandwidth processors and a variety of sophisticated software applications, providing access to telecommunications networks, the Internet, and remotely executed applications and services provided by remote server computers and computer systems. Cellular telephones commonly provide alphanumeric-text-entry keys and high-resolution LCD displays, and allow users to view web pages through a locally-executed browser.

Ultimately, it is expected that small mobile electronic devices will evolve to provide complete, fully functional computational platforms, telecommunications and electronic-data-communications interconnection, high-resolution digital still-picture and video photography, and other such functionalities in a single device, replacing, for most consumers, the need to carry and use separate cell phones, portable computers, digital cameras, and other current devices. To that end, developers, designers, and vendors of mobile electronic devices continue to increase the features and functionality provided by cell phones, lower power requirements of cell phones and provide extended-life power supplies in order to extend the duration of independent operation of cell phones, and continue to develop increasingly sophisticated software and hardware components to provide the increasing number of features and functionality. Currently, despite remarkable increases in memory densities, on-board memory remains a significant constraint to designers and developers of mobile electronic devices. Designers, developers, and vendors of electronic mobile devices therefore continue to seek new methods and subcomponents for increasing available memory resources within mobile electronic devices to facilitate continued development and improvement of memory-consuming software applications.

DETAILED DESCRIPTION OF THE INVENTION

Embodiments of the present invention are directed to extending the memory capacity for mobile electronic devices, including cellular telephones, by providing data storage on remote computer systems accessible to applications running on the mobile electronic devices. The discussion, below, is directed to embodiments of the present invention that provided extended memory to cell phones, but method and system embodiments of the present invention may be incorporated into additional types of mobile electronic devices.

Figure 1:
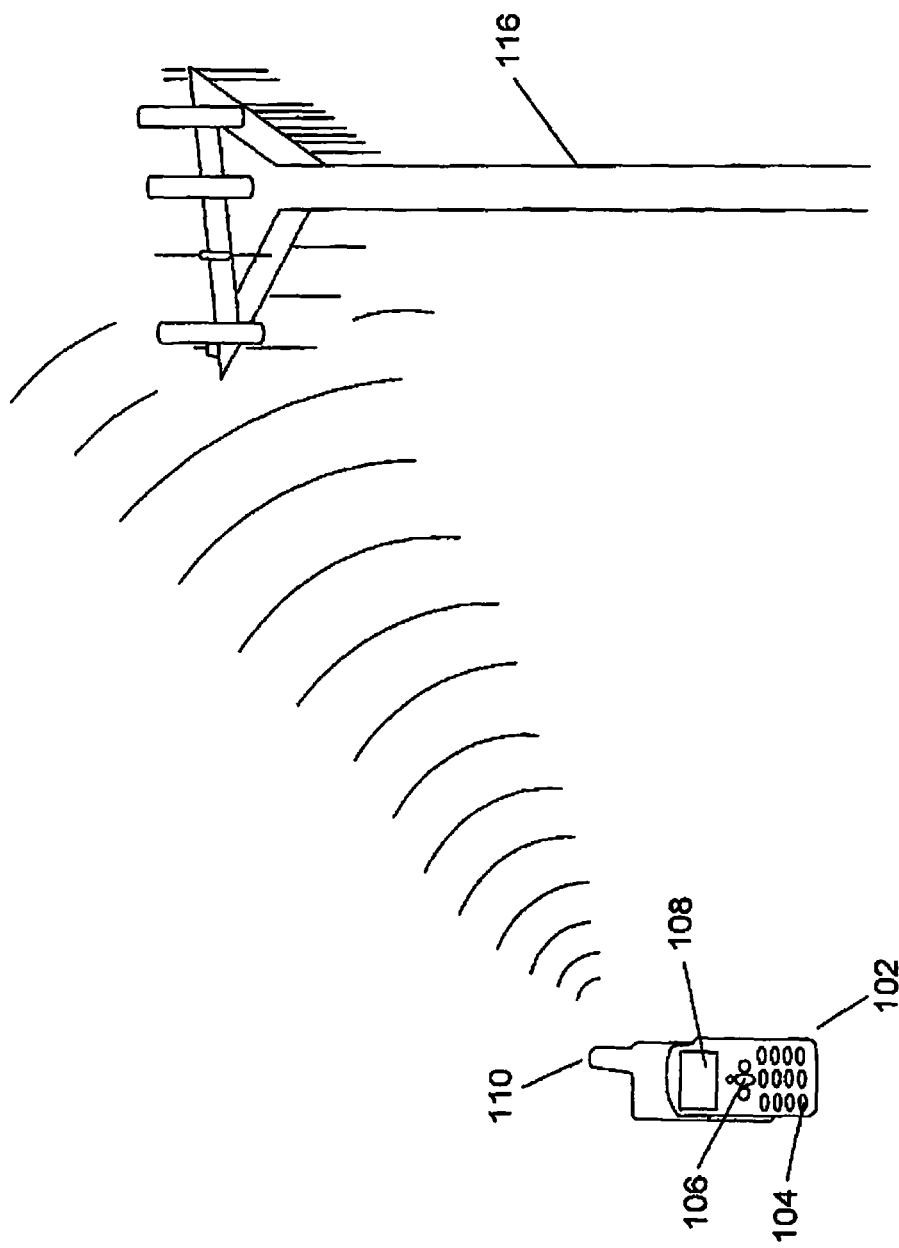
FIG. 1 illustrates a cell phone and cellular radio tower.

FIG. 1 illustrates a cell phone and cellular radio tower. The cell phone 102 is generally a compact, hand-held device that includes alphanumeric-character input keys, such as key 104, for input of numeric and text-character data, various control keys 106, for navigation through user-interface displays and menus, an LCD display 108, and a radio-frequency antenna 110. The cell phone broadcasts radio-frequency signals to, and receives radio-frequency signals from, one or more local cellular radio towers 116. The radio-frequency signals are multiplexed by frequency-division-multiple-access ("FDMA") or code-division-multiple-access ("CDMA") multiplexing to allow many cell telephones to broadcast and receive signals from multiple cellular radio towers within a local geographical area.

Figure 2:
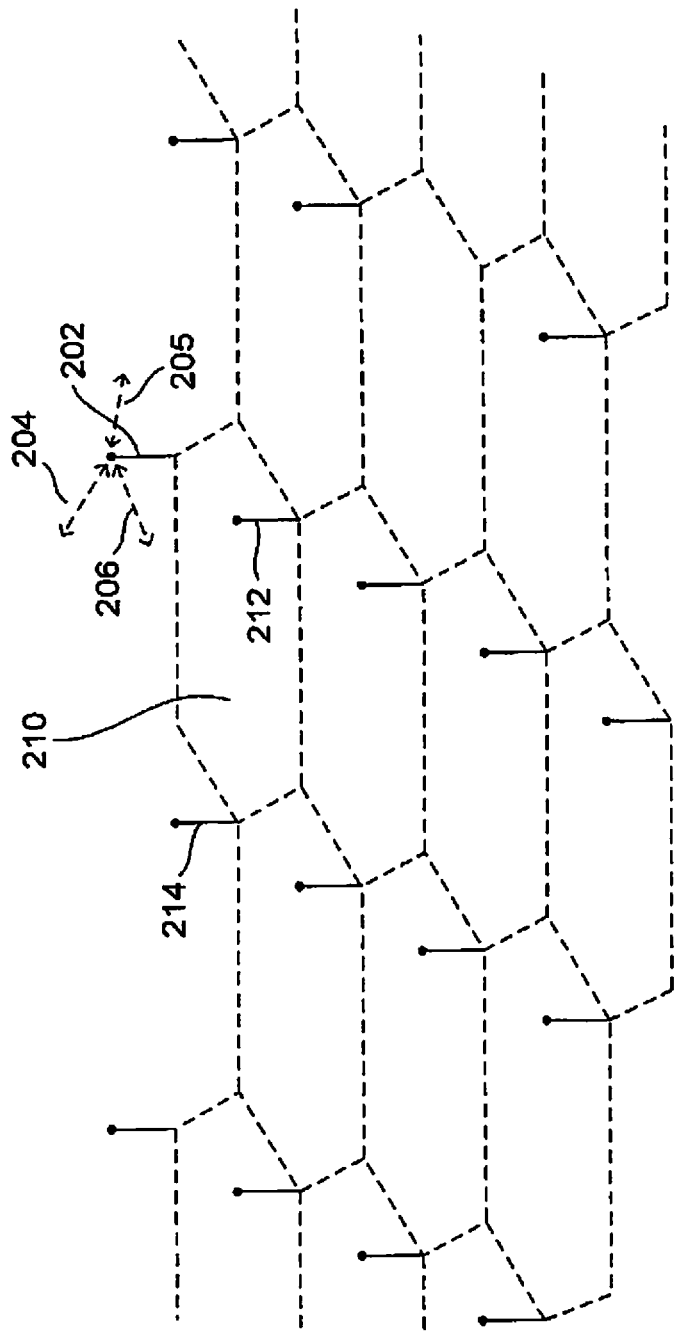
FIG. 2 illustrates partitioning of a geographical region into cells.

The word "cell" in the phrase "cell phone" and the word "cellular" in the phrases "cellular network" and "cellular radio tower" refers to the partitioning of a geographical region into generally hexagonally-shaped sub-regions, referred to as "cells," by the locations and directional broadcast characteristics of a number of cellular radio towers. FIG. 2 illustrates partitioning of a geographical region into cells. In FIG. 2, a large number of cellular radio towers are depicted as vertical line segments capped with a small disk, such as vertical line segment 202. Each cellular radio tower generally includes a three-sided, or triangular, antenna mount that allows for broadcast and reception or radio signals roughly aligned with three directional, co-planar axes separated from one another by 120°, such as the three axes 204-206 shown for cellular radio tower 202. The geographical region is subdivided into hexagonal cells, indicated in FIG. 2 by dashed lines. Hexagonal cell 210 is served by cellular radio towers 202, 212, and 214, each with a directional broadcast axis directed towards the center of the cell. A cell-telephone user may walk or drive from one cell to another, and the network of cellular radio towers, associated base stations connected to a complex telecommunications network, allows the telecommunications network to transfer the mobile-electronic device, in real time, from broadcasting and receiving signals from the cellular radio towers associated with one cell to those associated with another, without interruption in an on-going phone call or electronic data-exchange operation.

There are a variety of different types of mobile telecommunications systems. One common mobile telecommunications system is referred to as the "universal mobile telecommunication system" ("UMTS"), one of several third-generation ("3G") mobile telecommunications technologies. The UMTS system supports data transfer rates up to 21 Mbit/second, although, with current handsets, maximum data-transfer rates generally do not exceed 7.2 Mbit/second. UMTS systems provide for cells of varying sizes, depending on population density, presence of buildings and other obstacles, and other considerations. In rural areas, cellular telephone towers may be separated by distances greater than 30 miles, while, in certain urban environments, a cell may span a single floor of a building.

Figure 3:
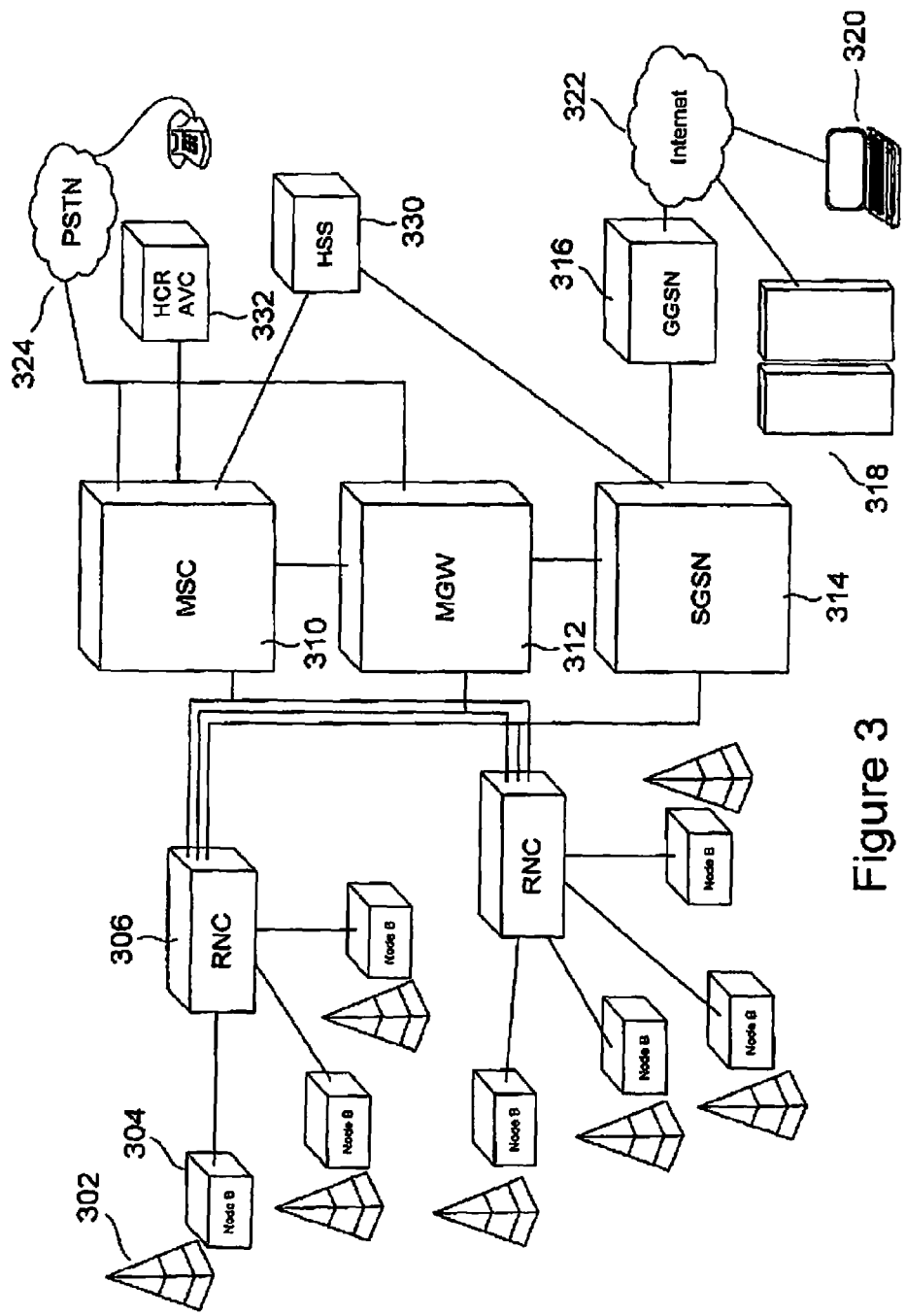
FIG. 3 illustrates certain of the components of a 3G telecommunications network.

FIG. 3 illustrates certain of the components of a 3G telecommunications network. In FIG. 3, cellular telephone towers and other antennas are indicated by antenna-like symbols, such as antenna-like symbol 302. Each cellular radio tower, or other antenna, is associated with a Node B base station, such as Node B base station 304 with which antenna 302 is associated. A single Node B base station may be associated with multiple antennas or cellular radio towers. The base stations include power amplifiers, digital-signal processors, and back-up batteries, and are generally responsible for broadcasting signals received by the base station from the cellular network to cell phones within the geographical area serviced by the base station and for forwarding signals received from cell phones to the cellular network. Base stations are directly connected to radio network controllers ("RNC"), such as RNC 306 in FIG. 3. Each RNC may be connected to multiple base stations. The RNCs are, in turn, connected to various components of the core cellular network, including a mobile switching center ("MSC") 310, a media gateway ("MGW") 312, and a serving GPRS support node ("SGSN") 314, the acronym "GPRS" standing for "general packet radio service." The SGSN 314 interconnects RNCs, via gateway GPRS support nodes ("GGSN") 316, to remote computing systems 318 and 320 via the Internet 322. The MSC 310 interconnects RNCs with a public switched telecommunications network ("PSTN") 324. The MGW 312 is concerned with data transfer in both circuit-based switch networks, such as PSTN, as well as in packet-based switch networks, such as the Internet, and is controlled by SGSNs and MSCs. Many additional components are included in the core telecommunications network, including a home-subscriber-server facility 330, home-location-register and authentication center 332, and many additional components and nodes not shown in FIG. 3.

Figure 4A:
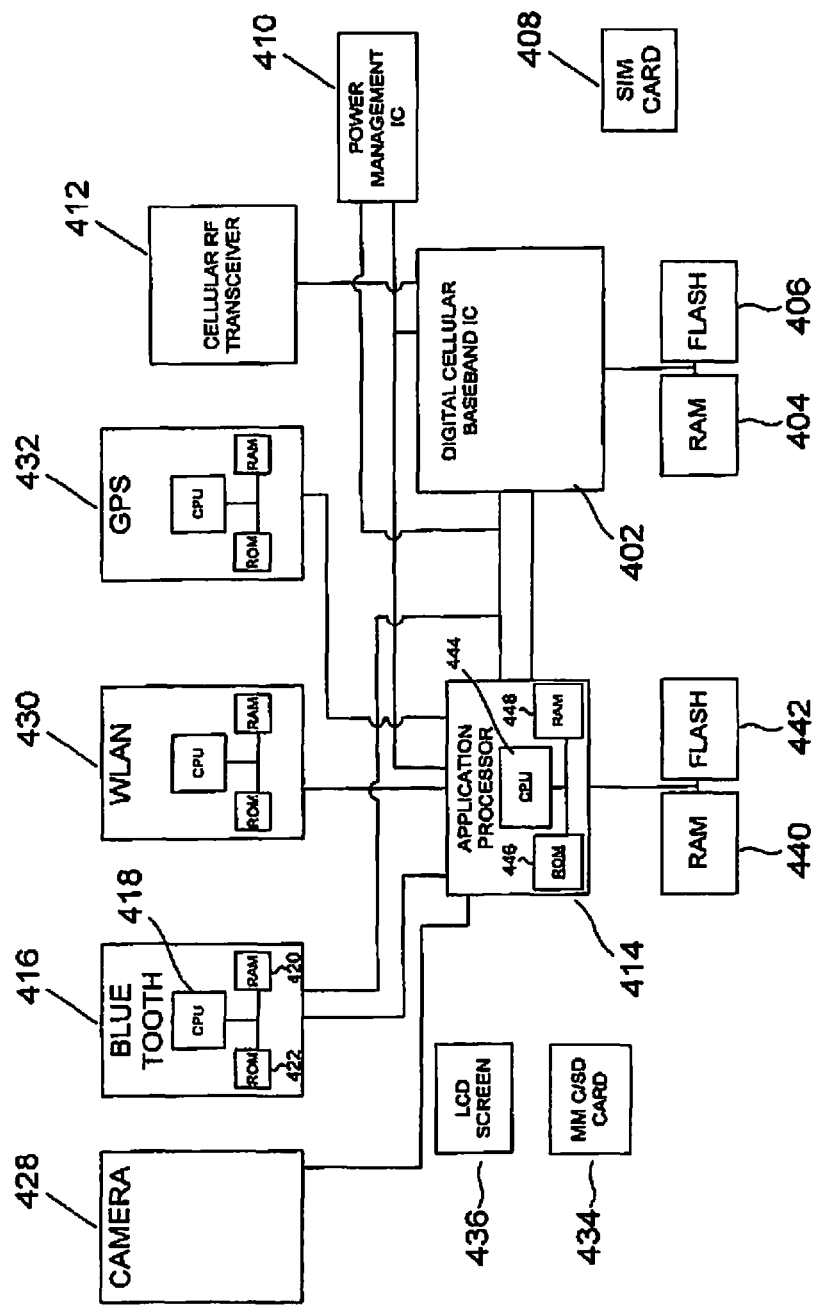
FIGS. 4A-B provide high-level block diagrams for certain of the internal components of a cell phone.
Figure 4B:
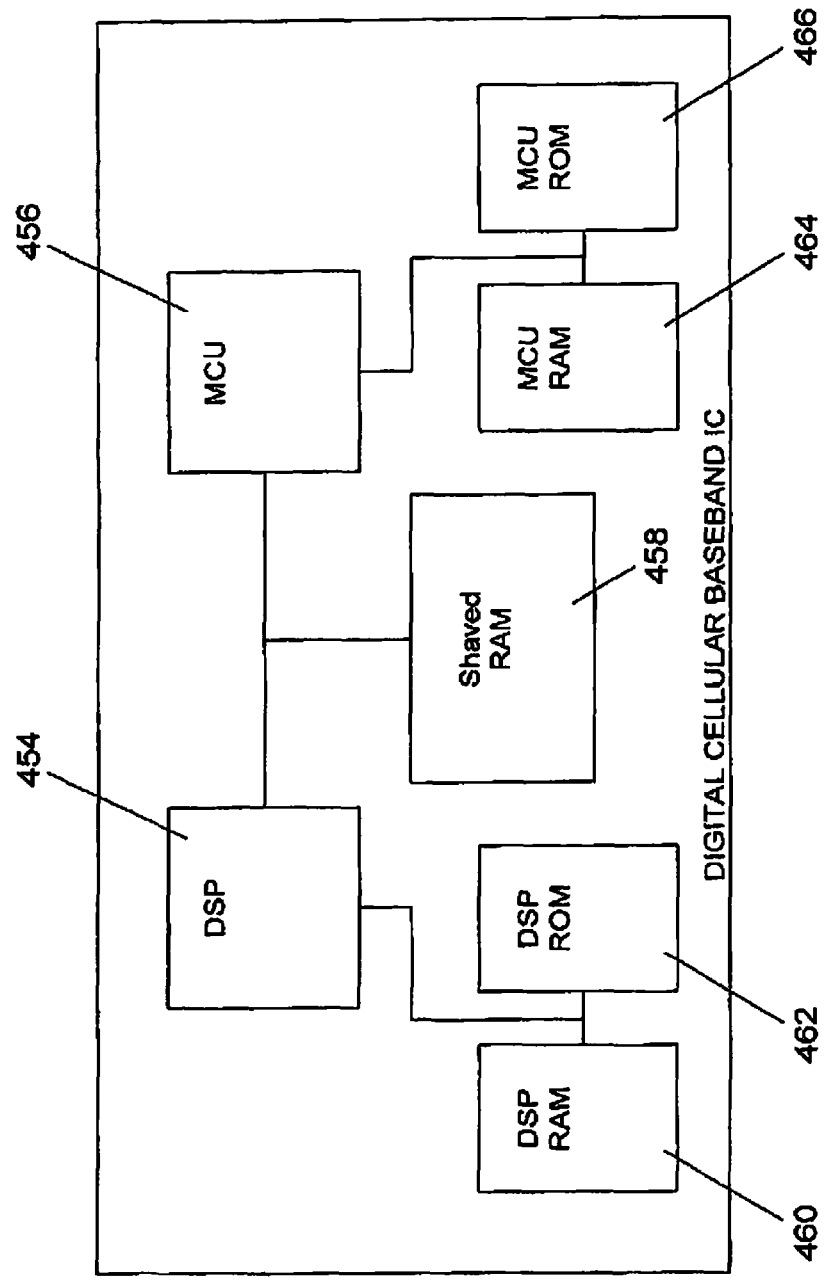

FIGS. 4A-B provide high-level block diagrams for certain of the internal components of a cell phone. Referring first to FIG. 4A, these components include a dual-core digital cellular baseband integrated circuit 402, which converts analog radio signals to digital signals and digital signals to analog signals, manages communications-protocol layers, and runs certain cell telephone applications, including applications responsible for initiation of phone-calls and maintenance of a locally-stored phone book, and a portion of the cell-phone user interface. The digital cellular baseband integrated circuit is interconnected with external RAM 404 and flash 406 memory, a subscriber identity module ("SIM"), or SIM card, 408, a power-management integrated circuit 410, a cellular radio-frequency ("RF") transceiver 412, a separate application processor integrated circuit 414, and a Bluetooth module 416 that includes a processor 418 and both RAM 420 and ROM memory 422. The application processor 414 provides the computational bandwidth to a variety of non-radio-communications applications, including digital-camera-based applications, Internet browser, games, networking, and GPS-related functions. An application processor may be connected to a video camera 428, a WLAN module 430, a GPS module 432, an MMC/SD card 434, and an LCD screen 436. The application processor is additionally interconnected with external RAM 440 and flash 442 memory, and includes a processor 444 and internal ROM 446 and RAM 448 memory.

FIG. 4B shows a high-level block diagram for the digital cellular baseband integrated circuit (402 in FIG. 4). The digital cellular baseband integrated circuit includes a digital signal processor ("DSP") 454, a microcontroller 456, shared internal RAM 458, and DSP-associated RAM 460 and ROM 462 as well as microcontroller-associated RAM 464 and ROM 466.

Figure 5:
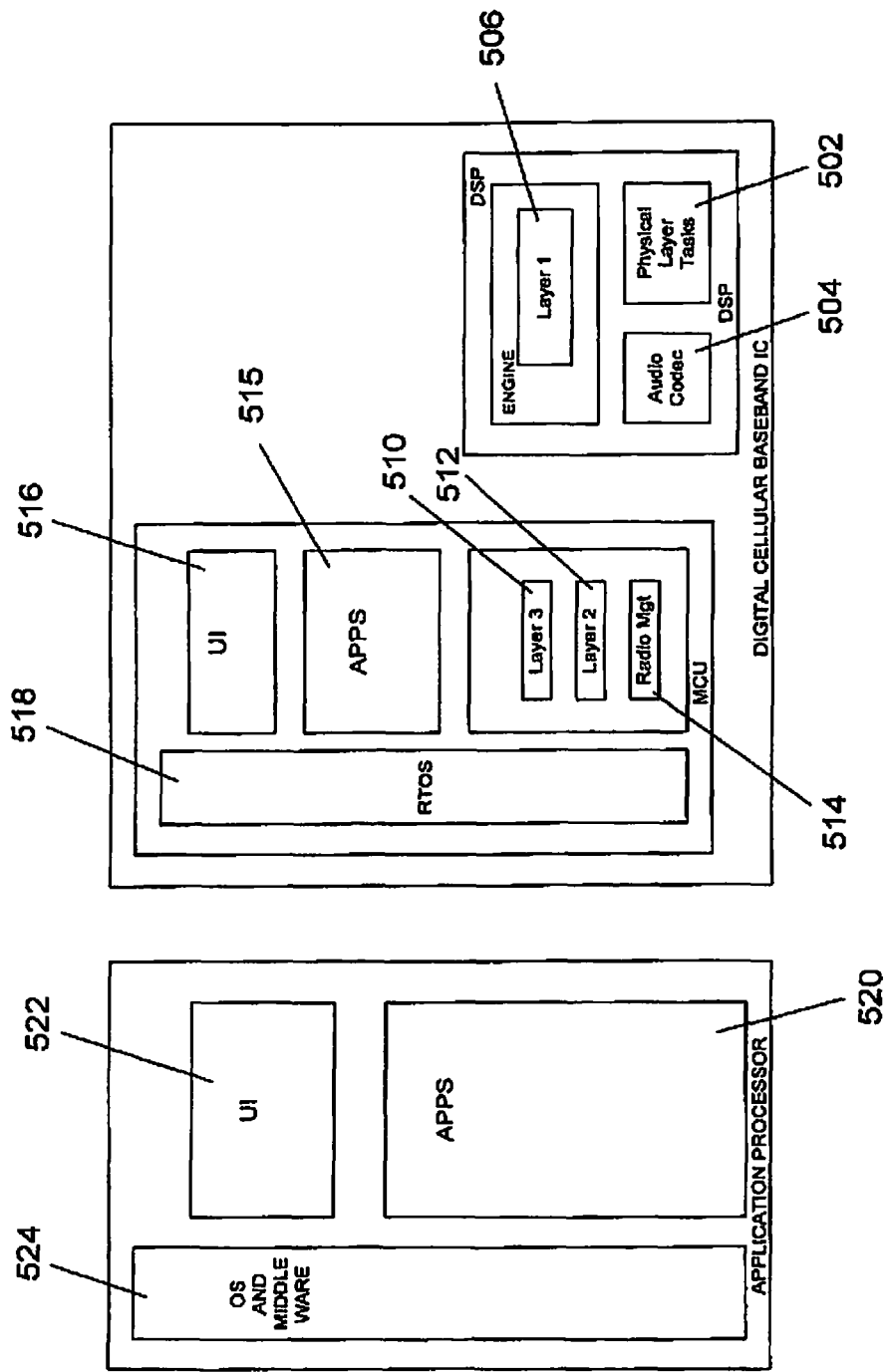
FIG. 5 provides a high-level block diagram of the software architecture for a cellular telephone.

FIG. 5 provides a high-level block diagram of the software architecture for a cellular telephone. The DSP (454 in FIG. 4B) is responsible for the physical layer of the protocol stack associated with RF broadcast and reception 502, provides an audio codec 504, and carries out tasks associated with the first layer of a three-layer communications-protocol stack 506. The microcontroller (456 in FIG. 4B) executes software that implements the upper two layers of the three-layer protocol stack 510 and 512, various radio-management functions 514, and executes certain applications 514 and user-interface routines 516 layered above a real-time operating system 518. For example, the microcontroller may store and manage a local phone book and provide a user-interface ("UP") for initiating and answering phone calls, via a phone application the executes on the microcontroller. The application processor (414 in FIG. 4) runs numerous software applications 520 and UI routines 522 above an operating system and a middle-ware layer 524.

A cell phone thus generally contains, at a minimum, three processors, including an application processor, microcontroller, and DSP, and often as many as six or more processors, including processors within separate Bluetooth, GPS, and WLAN modules. The cell phone includes various different electronic memories, some integrated with the processors and others external to the processors and interconnected with the processors via memory busses.

Cell telephones are generally low-power devices that run on energy stored in batteries or battery packs. Cell telephones are generally small, lightweight, and compact, and lack both the power and air-cooled volume to drive and cool relatively high-power components such as those normally found in desktop and laptop computers. While it is common for consumers to purchase and install gigabytes of additional memory into laptop and desktop computer systems, the capacity for memory in commonly available cell telephones is relatively limited. However, as discussed above, designers, manufacturers, and vendors of cell phones are providing ever-increasing numbers of applications and hardware components within cell phones, many of which use relatively large amounts of memory for both temporary and persistent storage of data. As a result, many of the features do not provide the full functionality desired by users. As one example, a user may often not be able to store as many still images or video clips on a cell phone as the user would like to, due to relatively limited memory capacity for storing images within the cell phone. Therefore, it has become increasingly important to develop additional memory capacity for cell phones and other mobile electronic devices, but within the low-power and low-heat-dissipation capacities of cell phones.

Figure 6:
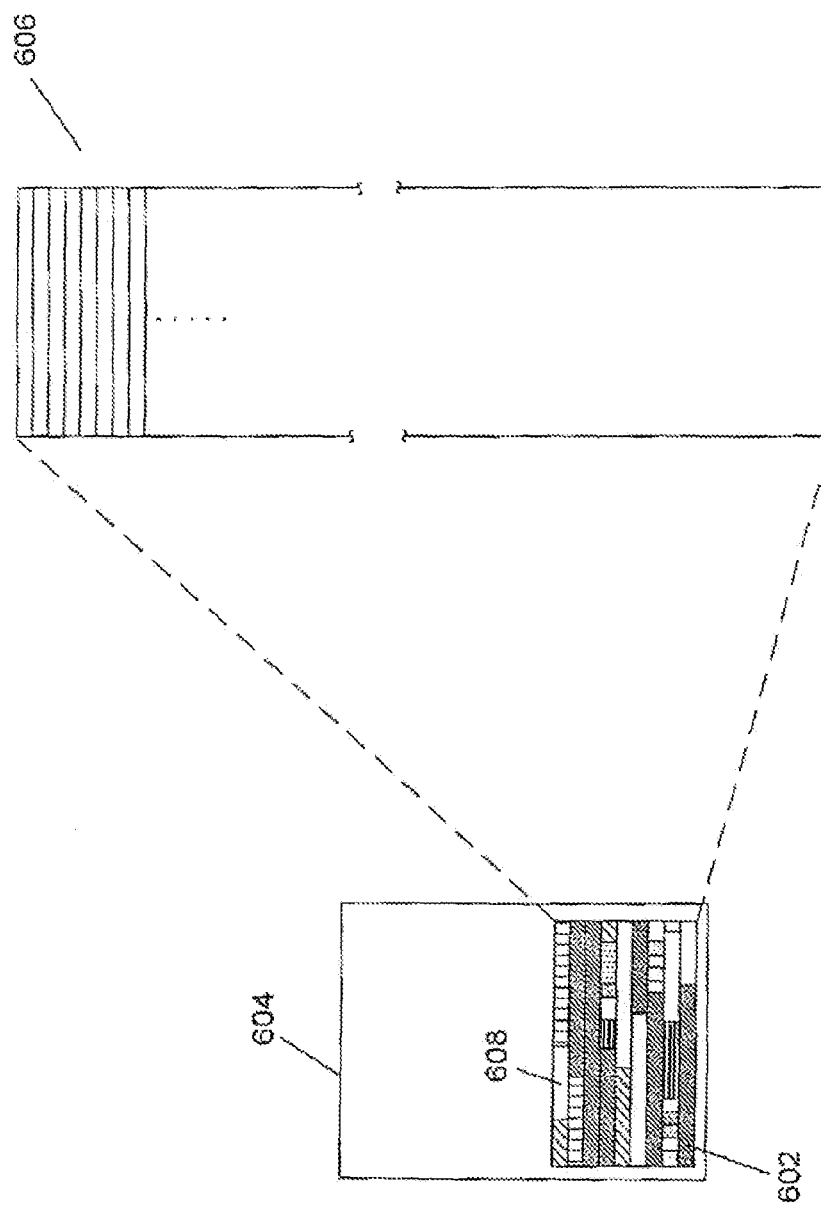
FIG. 6 illustrates a general approach of embodiments of the present invention.

Rather than attempt to add additional memory components to a cell phone, embodiments of the present invention instead employ the telecommunications-network-connectivity of a cell phone along with the inexpensive, robust, highly available, and reliable data-storage resources provided by remote computer systems to extend the memory capacity of the cell phone by distributing data storage for applications within a cell phone across a telecommunications network. FIG. 6 illustrates a general approach of embodiments of the present invention. In FIG. 6, numerous data objects are shown within a relatively limited addressable memory space 602 within a mobile electronic device 604. Because the memory facilities within the mobile electronic device are limited, only a relatively small number of data objects can be stored within the mobile electronic device. However, because of the inherent locality of reference to local memory by executing application programs, the local memory 602 within the mobile electronic device, rather than being used as the sole data-storage facility available to electronic-mobile-device applications, can instead be used as a window into a vastly larger data-storage resource 606 provided by one or more remote servers, computer systems, or distributed computer systems. Data objects, such as data object 608 in the local memory 602 of the mobile electronic device 604 shown in FIG. 6, can migrate from the mobile electronic device to remote data-storage facilities 606 and can migrate from the remote data-storage facilities 606 back to the local, internal memory 602 of the mobile electronic device, on an as-needed basis.

Not only may there be significant locality of reference with respect to local memory, in general, there may additionally be significant locality of reference with respect to a given data object. Therefore, a given data object may be distributed between local memory 602 and the remote data-storage facility 606. As one example, a user may edit a text data object via a text-editor application on the mobile electronic device, but may need to edit only one or two paragraphs within a lengthy text file. The lengthy text file can therefore be distributed between the local memory and the remote data-storage facility, with the one or two paragraphs currently being edited stored in local memory and the remaining paragraphs of the lengthy text file stored in the remote data-storage facility. Data objects can be automatically transferred to and from the remote data-storage facility, on behalf of a user of a mobile electronic device, or may be transferred or distributed as a result of one or more commands directed by the user to an extended-memory facility that executes, in part, within the mobile electronic device.

Figure 7:
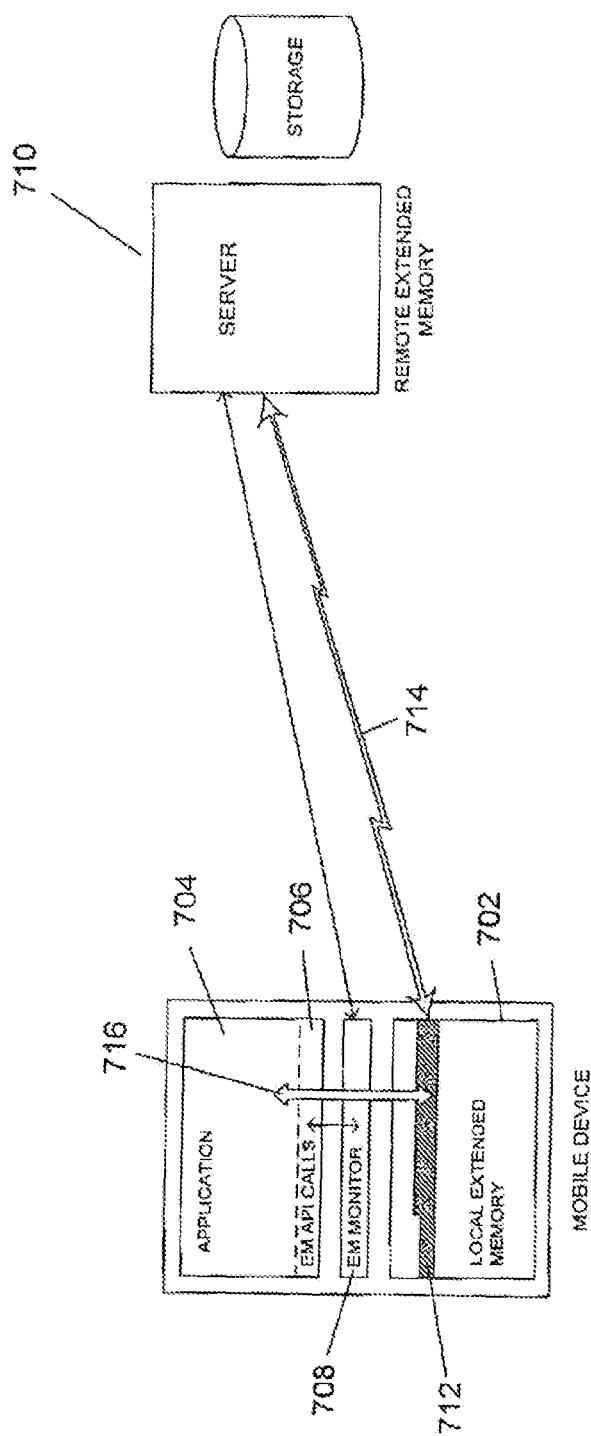
FIG. 7 illustrates, at a conceptual level, one embodiment of the present invention.

FIG. 7 illustrates, at a conceptual level, one embodiment of the present invention. As discussed above with reference to FIG. 6, data is distributed across a telecommunications network in order to extend the data-storage capacity of a mobile electronic device. A portion of the internal memory resources of the mobile electronic device is reserved for an extended-memory facility that is distributed between the mobile electronic device and one or more remote computer systems. The memory reserved for use by the extended-memory facility is referred to as "local extended memory" 702. Each application program 704 that executes within the mobile electronic device can incorporate extended-memory ("EM") application-programming interface ("API") calls 706 to allow the application program to use the extended-memory facility. In certain cases, the API calls execute within the address space of the application and within the process context of the application to allow the application to directly access the data object, or a portion of the data object, in local extended memory. In other cases, the calls may result in subsequent calls to asynchronously executing, separate processes that are referred to, in the aggregate, as the extended-memory monitor ("EM monitor") 708. The EM monitor 708 communicates with an extended-memory-service application ("EM service app") running within one or more remote computer systems 710 in order to coordinate data exchange between the mobile electronic device and the remote computer systems and maintain data on the remote computer systems on behalf of the mobile electronic device. Thus, for example, the application program can, via EM API calls, request that a particular object be re-instantiated in local extended memory 712, resulting in transfer 714 of the data object from a remote computer system to the mobile electronic device via the telecommunications network, following which the application program can directly access 716 the re-instantiated data object.

Figure 8:
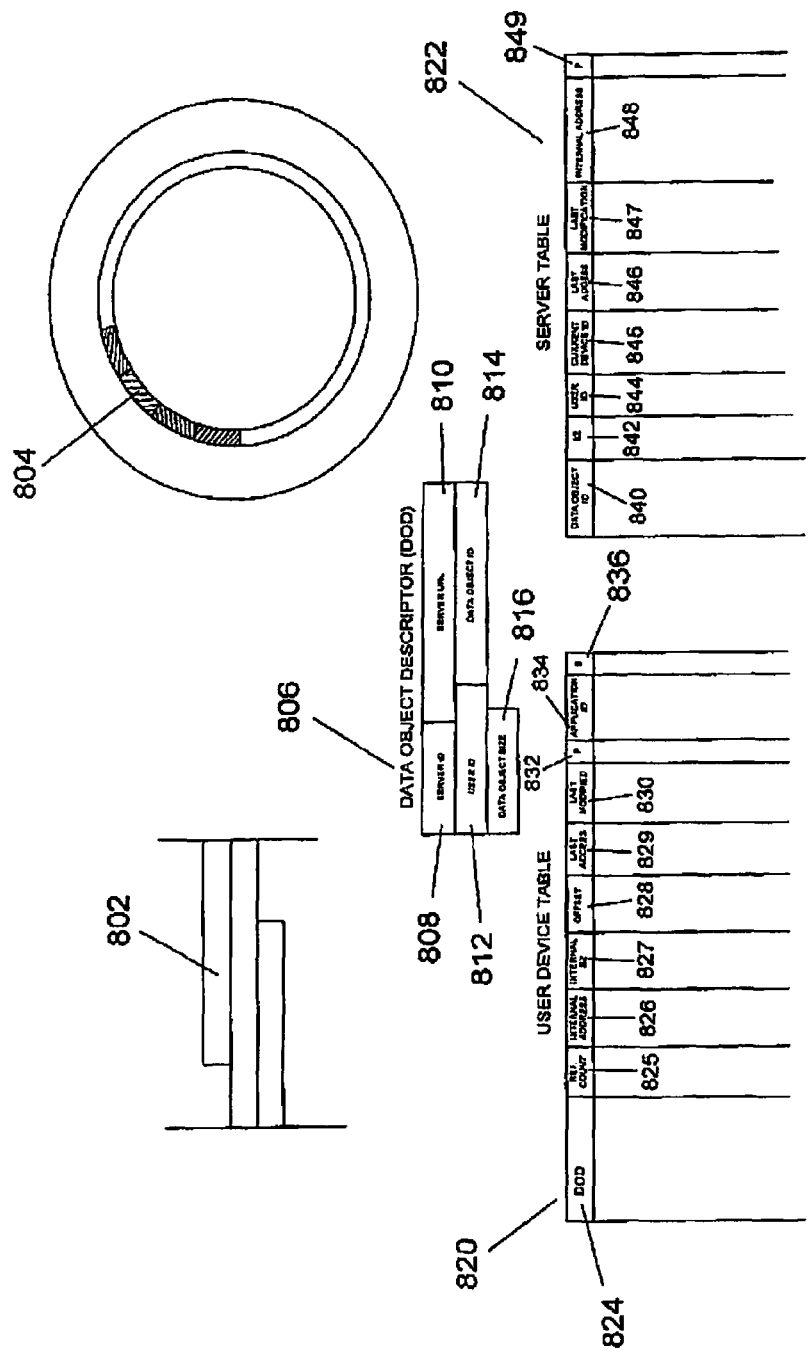
FIG. 8 illustrates the various types of information maintained by a mobile-electronic-device extended-memory monitor and an extended-memory application running on one or more computer systems according to embodiments of the present invention.

FIG. 8 illustrates the various types of information maintained by a mobile-electronic-device extended-memory monitor and an extended-memory application running on one or more computer systems according to embodiments of the present invention. As discussed above, a given data object may be stored within the local extended memory on a mobile-electronic device 802 and may also be stored on one or more mass-storage devices 804 within one or more remote computer systems. As discussed above, a particular data object may even be partitioned between local extended memory within a mobile electronic device and one or more mass-storage devices on one or more remote computer systems. Embodiments of the present invention are discussed, below, in which data is remotely stored on a single server computer on behalf of a mobile electronic device. However, in alternative embodiments, a particular data object may reside within the local extended memories of multiple mobile electronic devices and may be stored on multiple remote computer systems, including multiple computer systems that together constitute a distributed computer system. In all of these cases, each data object needs to be uniquely identified by a data-object descriptor.

One embodiment of a data-object descriptor ("DOD") 806 is a multi-field record, or multi-data-member object, that includes a server ID 808 that identifies a server computer or computer system with primary responsibility for storing the data object described by the DOD, a server address 810, such as a URL for the EM service app executing on the server or computer system with primary responsibility for storing the data object, a user ID 812 that uniquely identifies the user or owner of the data object, a data-object ID 814 that uniquely identifies the data object at least with respect to all of the data objects associated with the user identified by the user ID 812, and, optionally, an indication of the size of the data object 816, such as the number of bytes that together comprise the data object. In alternative embodiments of the present invention, the DOD may contain fewer fields or a greater number of fields. However defined and constructed, the DOD needs to provide a unique identification of each data object managed by an EM service app.

In one embodiment of the present invention, the mobile electronic device maintains a table of active data objects 820 and the EM service app executing on one or more computer systems maintains a table of data objects currently managed by the one or more computer systems 822. Each entry in the user device table ("UDT") 820 includes the DOD 824 for the data object, a reference count 825, an internal address 826 within local extended memory at which the data object is currently located, the size of that portion of the data object currently stored in local extended memory 827, the offset 828 within the data object of the first byte at the internal address 826, indications of the times at which the data object was last accessed 829 and last modified 830, when such information is available, a flag 832 indicating whether or not the data object is persistently stored, an application ID identifying the application that manages the data object 834, and a status for the data object 836. The UDT 820 shown in FIG. 8 is but one example of many possible UDTs that may be employed, in alternative embodiments of the present invention, to track active data objects by the EM monitor within a mobile electronic device.

Each entry in the server table 822 includes, for the data object described by the entry, the data-object ID 840 associated with the data object, the size of the data object 842, the ID of the user who owns the data object 844, an ID for the mobile electronic device currently accessing the data object 845, indications of the times of last access 846 and last modification 847 of the data object, the internal mass-storage-device address for the object 848, and a flag indicating whether or not the data object is persistently stored 849. In alternative embodiments of the present invention, in which a data object may be currently accessed by multiple mobile electronic devices, there may be a list of current device IDs rather than a single current device ID 845 stored in the server table. Similarly, additional fields may describe various redundantly stored copies of the data object in a multi-server or distributed-computer-system implementation. The UDT and server table may be implemented as relational database tables, as formatted files, or in any of many other ways used to store data objects.

Figure 9:
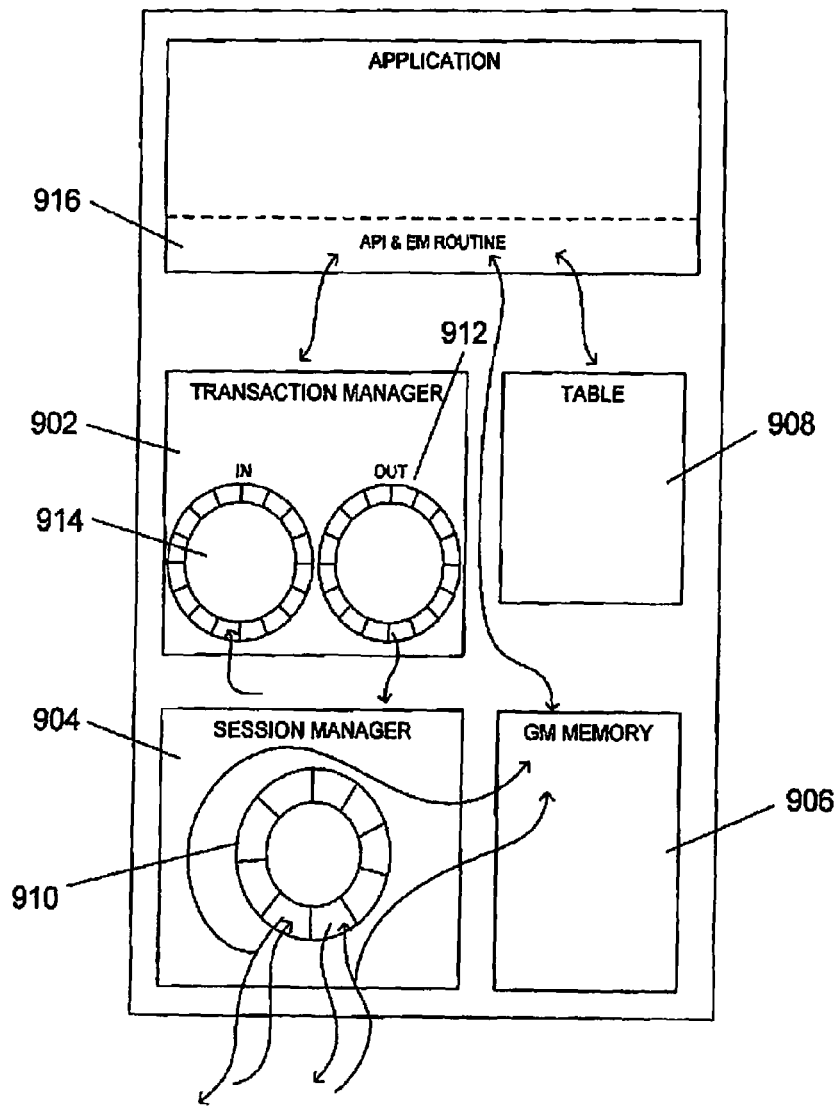
FIG. 9 illustrates components of an extended-memory monitor within a mobile electronic device that represents one embodiment of the present invention.

FIG. 9 illustrates components of an extended-memory monitor within a mobile electronic device that represents one embodiment of the present invention. The EM monitor (708 in FIG. 7) includes a transaction manager 902 and a session manager 904. The EM monitor accesses the local extended memory 906 within the mobile electronic device and the UDT 908 that may be stored in the local extended memory 906 or in other memory accessible to EM-monitor components as well as to EM API routines linked with application programs.

In one embodiment of the present invention, the transaction manager and session manager are separate processes that run above the operating system (624 in FIG. 6) on the application processor (414 in FIG. 4) of the mobile electronic device. The session manager 904 is concerned with creating and managing a pool of sessions 910, each of which represents a communications session between the mobile electronic device and a remote computer system running the EM service app. Each session is associated with an open link, or path, through the telecommunications network, by which data can be transferred to, and received from, a remote computer system. The session manager receives transactions from the transaction manager, associates the transactions with sessions, and ensures that the communication protocols underlying a session are correctly followed in order to communicate the transaction and associated data to a remote computer system and receive data returned from the remote computer system at transaction completion. In certain embodiments of the present invention, the session manager may create a new session for each received transaction, while, in alternative embodiments of the present invention, the session manager may maintain a small pool of open sessions during times when the EM monitor is actively executing transactions in order to avoid the computational overhead and latency attendant with opening and closing sessions. The session manager interfaces to communications interfaces within the mobile electronic device that allow the mobile electronic device to access remote computing systems (i.e., 318 and 320 in FIG. 3) via the telecommunications network. The details of these interfaces vary from telecommunications system to telecommunications system, and are therefore not further described in this document.

The transaction manager manages an outgoing transaction queue 912 and incoming transaction queue 914, serving as a buffer for transactions issued by one or more applications executing within the mobile electronic device and transaction completions returned to the transaction manager by the session manager. Transactions are input to the transaction manager via EM API routines 916 linked to executing application programs. Transaction completions can be returned to the executing application programs either synchronously or asynchronously, depending on how the transactions are issued to the transaction manager by the application programs as well as on the details of specific embodiments of the present invention. The transaction manager may buffer input transactions until sessions are available in the sessions manager and may similarly buffer transaction completions until the transaction completions can be returned to application programs that issued the transactions.

Figure 10:
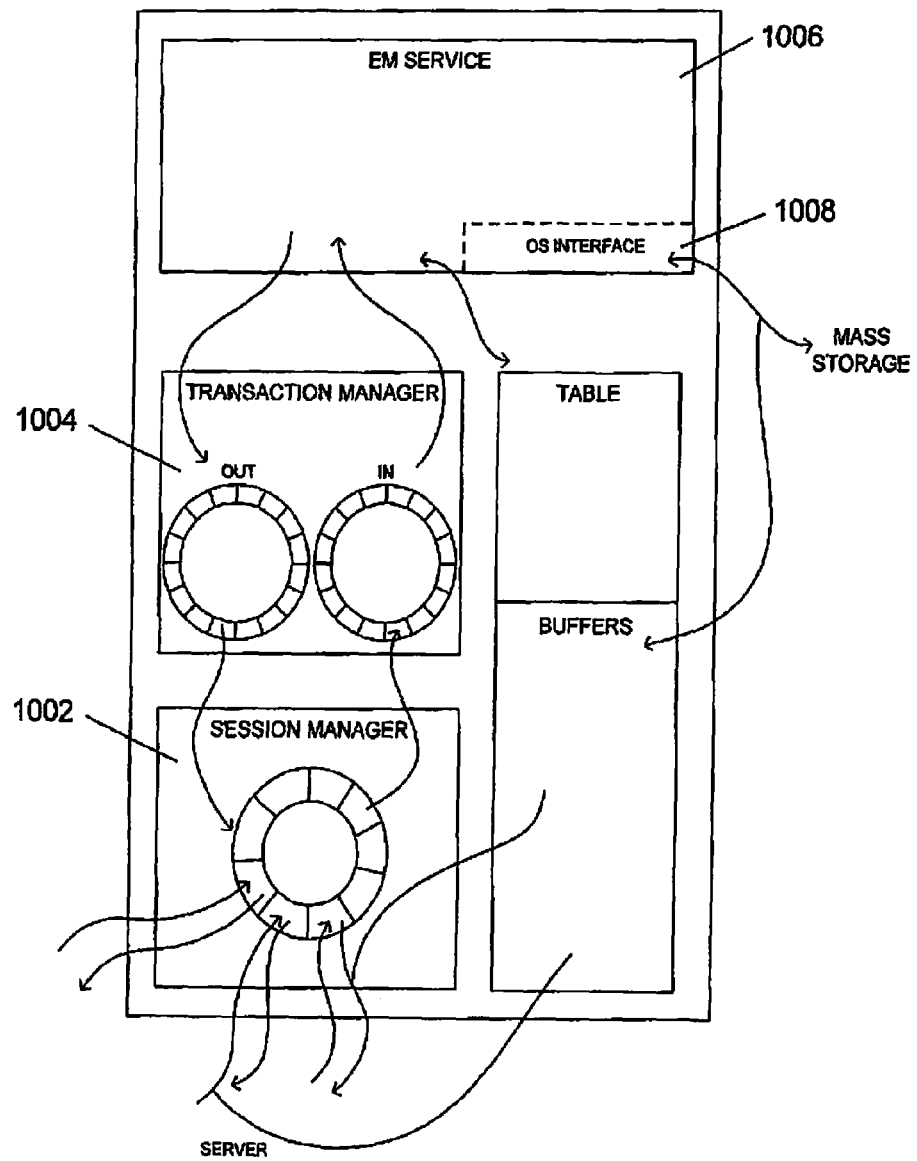
FIG. 10 illustrates components of an extended-memory-service application that executes on one or more remote computer systems in order to provide data-storage facilities to remote mobile electronic devices according to one embodiment of the present invention.

FIG. 10 illustrates components of an extended-memory-service application that executes on one or more remote computer systems in order to provide data-storage facilities to remote mobile electronic devices according to one embodiment of the present invention. The components of the EM service app are similar to those of the EM monitor that executes within mobile electronic devices, including a session manager 1002 and transaction manager 1004. The EM service app 1006 runs above an operating system 1008, executes incoming transactions and provides transaction completions to the transaction manager 1004 as well as managing storage and retrieval of data objects from mass-storage devices. The EM service app may additionally access communications network components, including various of the components shown in FIG. 3, as well as various databases and other stored information in order to authenticate users and verify transactions.

The EM API interface provided to application programs executing on mobile electronic devices may include a variety of API routines. The routines may be used to create, open, and delete data objects as well as to read the data objects from remote data-storage facilities and write the data objects to remote data-storage facilities. Additional routines may allow an application program to obtain information about data objects currently associated with the application program, to obtain information concerning the various remote computing systems that implement the EM facility, and to obtain various types of meta-level information about particular data objects. In the following discussion, the following simple API is an exemplary EM API that provides basic extended-memory functionally to application programs executing on mobile electronic devices:

DOD=new(int sz, bool persistent, &status)

bool=open(DOD, int offset, int length, &status)

char=read(DOD), int offset, int length, &status)

bool=write(DOD, int offset, int length, &status)

bool=close(DOD, &status)

bool=delete(DOD, &status)

The routine "new" allows an application program to create a new data object. Arguments include: (1) sz, indicating an initial, projected size for the data object; (2) persistent, indicating whether or not the data object should be persistently stored; and (3) status, returned to the application program to indicate the completion status for the routine call. Each of the remaining routines in the interface also includes a status argument, passed by reference to the routine, to provide status information with regard to execution of the routine. The routine "open" opens an existing data object, and arguments include: (1) the DOD for the data object; (2) an offset into the data object of the first byte in the data object to be accessed; and (3) the length of the window opened into the data object. The routine "close" allows an application program to close an open data object. The routine "delete" allows an application program to delete a data object from the extended-memory system. The routine "read" allows an application program to request an indicated window of data within the data object be placed in local extended memory, and returns a pointer to that window of data. An application program can then access the data within the requested window of the data object directly, without making additional API-routine calls. In certain embodiments of the present invention, the EM monitor may be notified with regard to each access by an application program to a data object, or portion of a data object, in local extended memory in order to ensure that accesses are valid. In alternative embodiments of the present invention, the responsibility for properly accessing local extended memory lies with the application programs. If the window of data requested in the read routine differs from the window specified to the routine "open," the window is adjusted, by the EM monitor, so that the requested data can be accessed by the application program. The routine "write" requests that a specified window of the data object specified by the offset and length arguments be transferred back to remote storage by the EM monitor. In the simple interface provided above, application programs are responsible for storing DODs for each data object that they have opened. In alternative embodiments of the present invention, this information may be provided to application programs via additional EM API routines.

Figure 11:
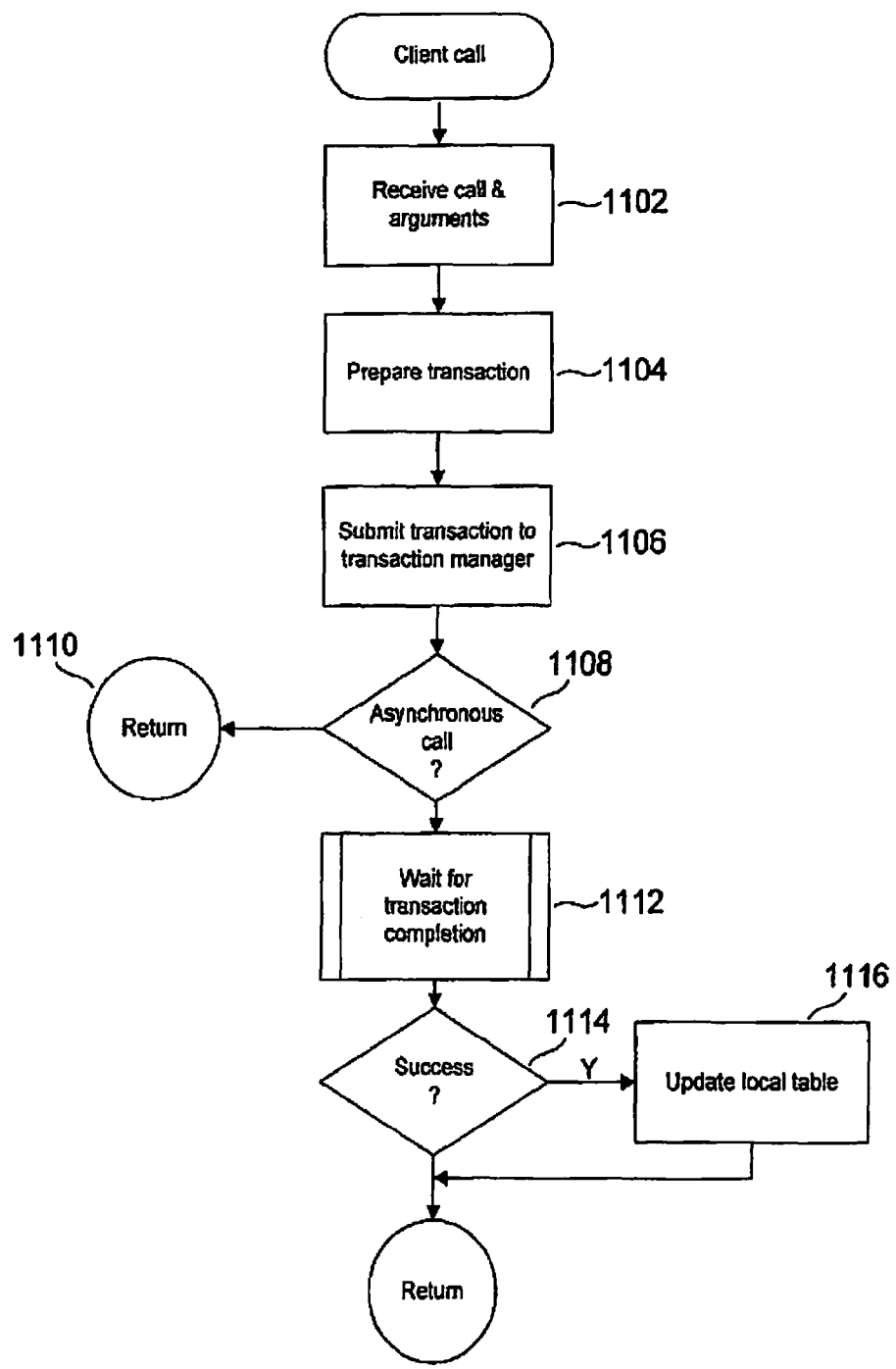
FIG. 11 provides a control-flow diagram for a generalized call, by an application program executing on a mobile electronic device, to an extended-memory routine that, in turn, prepares and submits a transaction to the extended-memory monitor within the mobile electronic device according to embodiments of the present invention.

FIG. 11 provides a control-flow diagram for a generalized call, by an application program executing on a mobile electronic device, to an extended-memory routine that, in turn, prepares and submits a transaction to the extended-memory monitor within the mobile electronic device according to embodiments of the present invention. In step 1102, a call to an EM API routine is made by an application program, and argument values are passed to the EM API routine running in the context of the application program. Although, in certain cases, the call may be executed entirely by an EM routine executing within the context of the application program, the EM API routine generally prepares a transaction, in step 1104, and then submits the transaction, in step 1106, to the transaction manager component of the EM monitor. If the call is an asynchronous call, as determined in step 1108, then the routine returns, in step 1110, having prepared the application program for an eventual callback or other notification when the transaction completes. When the call is synchronous, as determined in step 1108, the routine waits, in step 1112, for transaction completion. Once the transaction completes, the routine determines, in step 1114, whether or not the transaction has successfully completed. If so, then any updates necessary to the UDT are made, in step 1116. For example, if the application program called the routine "new," described above with reference to the exemplary EM API, then, when the transaction has successfully completed and a remote server has assigned identifiers for the object and has allocated a server-table entry for the extended-memory data object, an entry may be placed in the UDT for that data object. In the above, exemplary interface, there is no indication whether or not the routines are asynchronous or synchronous. For purposes of the current discussion, routines may be assumed to be synchronous. However, in alternative embodiments, an application program may be provided a choice between synchronous and asynchronous execution of API routines, in order to appropriately handle potential latencies involved in transaction execution carried out by remote computing systems and by exchange of transactions and data through the telecommunications network.

Figure 12:
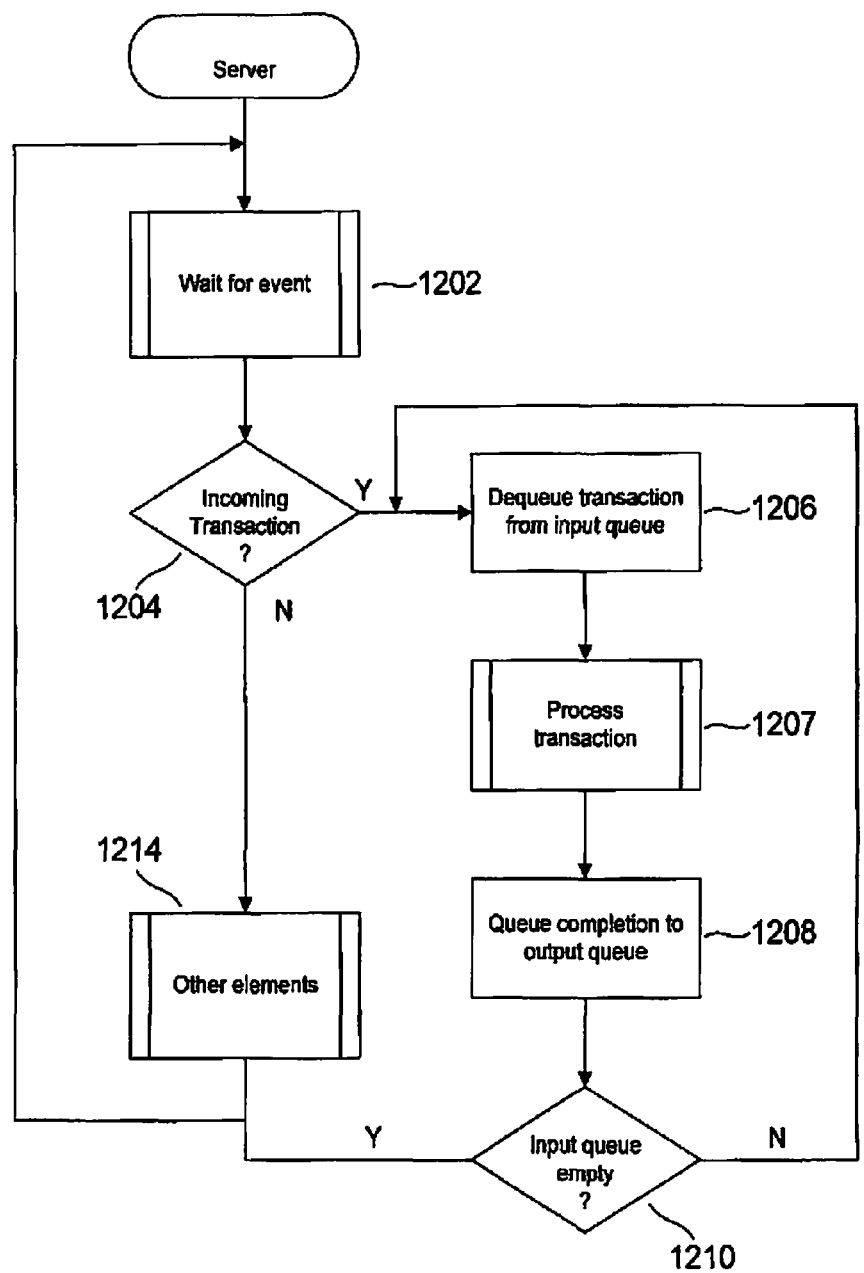
FIG. 12 illustrates generalized transaction processing by the extended-memory-service application running on a remote computer system according to embodiments of the present invention.

FIG. 12 illustrates generalized transaction processing by the extended-memory-service application running on a remote computer system according to embodiments of the present invention. In general, the EM service app includes an event loop in which the EM service app waits for events to occur and responds to those events. In step 1202, the EM service app waits for a next event. When an event occurs, the EM service app determines, in step 1204, whether the event corresponds to the arrival of an incoming transaction in the input queue of the transaction manager. If so, then, in step 1206, the EM service app dequeues the transaction from the input queue and processes the transaction, in step 1207. Once the transaction has been processed, then a transaction-completion indication is queued to the output queue of the transaction manager, in step 1208. If the transaction input queue is empty, as determined in step 1210, control returns to step 1202. Otherwise, control returns to step 1206, where a next available transaction is dequeued. Any other events, of which there may be numerous, are handled by an event handler called in step 1214. In general, each of the different transactions can be carried out by the EM service app by updating the server table, storing data on one or more mass-storage devices, and/or retrieving data from one or more mass-storage devices. In addition, an EM service app may interface with components of the telecommunications network or with other external databases to authenticate users, mobile electronic devices, and requested transactions.

Figure 13:
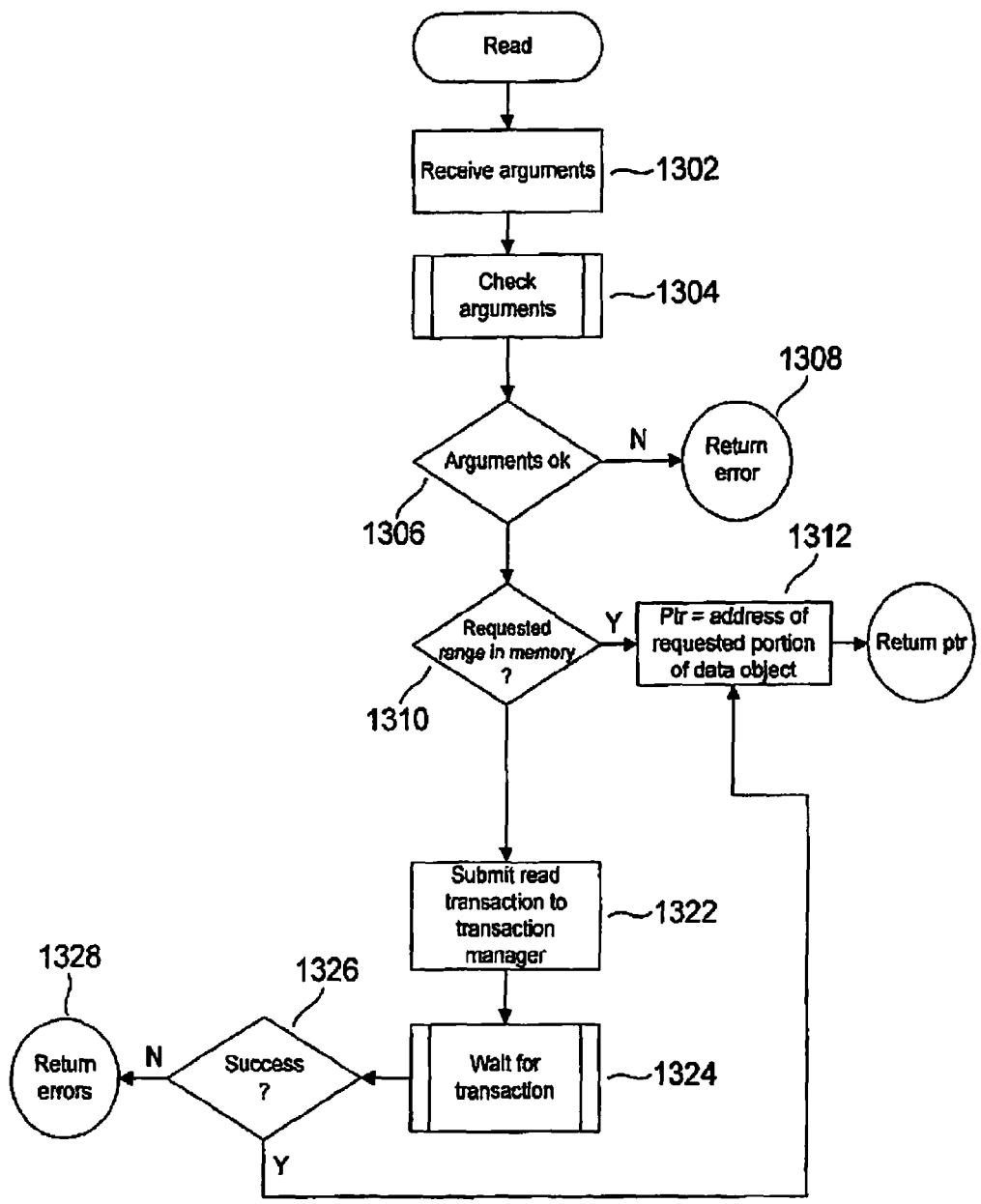
FIG. 13 provides a control-flow diagram for the extended-memory application-programming-interface routine "read," according to one embodiment of the present invention.

FIG. 13 provides a control-flow diagram for the extended-memory application-programming-interface routine "read," according to one embodiment of the present invention. In step 1302, the routine "read" receives arguments and, in step 1304, calls the routine "check arguments" to validate the values of arguments supplied by the calling application program. If the arguments cannot be validated, as determined in step 1306, then an error is returned in step 1308. Otherwise, in step 1310, the routine "read" determines whether the requested data-object window currently resides in local extended memory. When the requested window resides in local extended memory, a pointer is initialized to a point to the first byte of the requested window, in step 1312, and that pointer is returned in step 1314, along with a success status, to the calling application program. Otherwise, the routine "read" prepares a read transaction and submits the transaction to the transaction manager, in step 1322. In step 1324, the routine "read" waits for the transaction to complete. When the transaction has completed, and when the transaction has returned a completion status indicating success, as determined in step 1326, then control flows to step 1312. Otherwise, an error is returned in step 1328.

Figure 14:
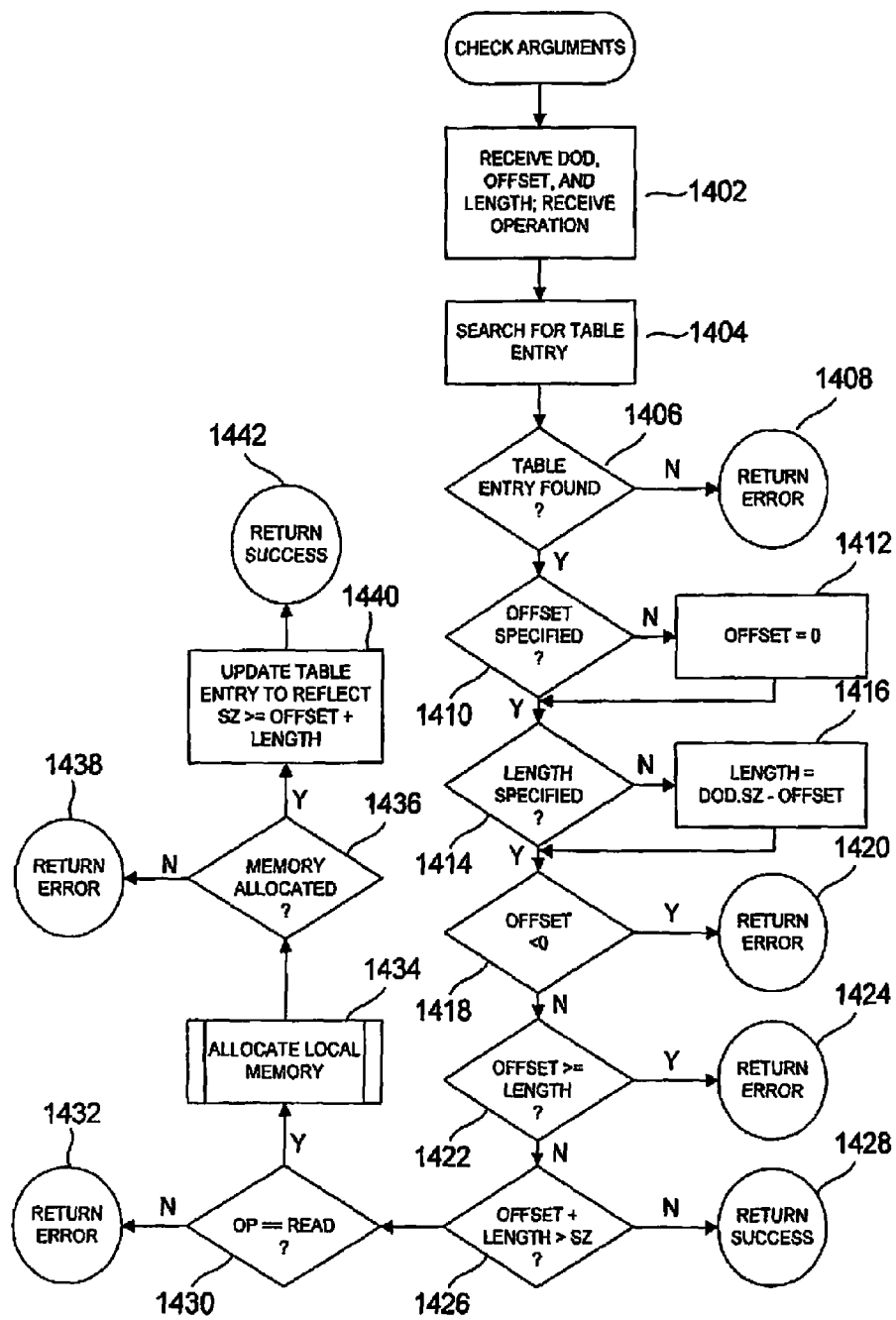
FIG. 14 provides a control-flow diagram for the routine "check arguments," called in step 1304 of FIG. 13, according to one embodiment of the present invention.

FIG. 14 provides a control-flow diagram for the routine "check arguments," called in step 1304 of FIG. 13, according to one embodiment of the present invention. In step 1402, the DOD, offset, and length argument values are received. In step 1404, the routine "check arguments" searches the UDT for a table entry corresponding to the DOD. If a table entry is not found, as determined in step 1406, an error is returned in step 1408. Otherwise, in step 1410, the routine "check arguments" determines whether or not an offset was specified. If no offset was specified, then a default value of 0 is assigned to the offset in step 1412. In step 1414, the routine "check arguments" determines whether or not a length was specified. If no length was specified, then a default length is computed and assigned in step 1416. In step 1418, the routine "check arguments" determines whether the offset is less than 0. When the offset is less than 0, an error is returned in step 1420. In step 1422, the routine "check arguments" determines whether or not the offset is greater than or equal to the length of the data object. When the offset is greater than or equal to the length of the data object, then an error is returned in step 1424. In step 1426, the routine "check arguments" determines whether or not the offset plus the length is greater than the size of the data object. When the offset plus the length is not greater than the size of the data object, then success is returned in step 1428. Otherwise, in step 1430, the routine "check arguments" determines whether or not the requesting routine is the read routine. When the requesting routine is not the read routine, an error is returned in step 1432. When the requesting routine is the read routine, as determined in step 1430, the routine "check arguments" calls the routine "allocate local memory," in step 1434 in order to ensure that sufficient memory is available for extending the data-object window, in local extended memory, to accommodate the requested data. When sufficient memory is not found, as determined in step 1436, an error is returned in step 1438. Otherwise, the UDT is updated to reflect the current size of the data-object window in local extended memory, in step 1440, and success is returned in step 1442.

Figure 15:
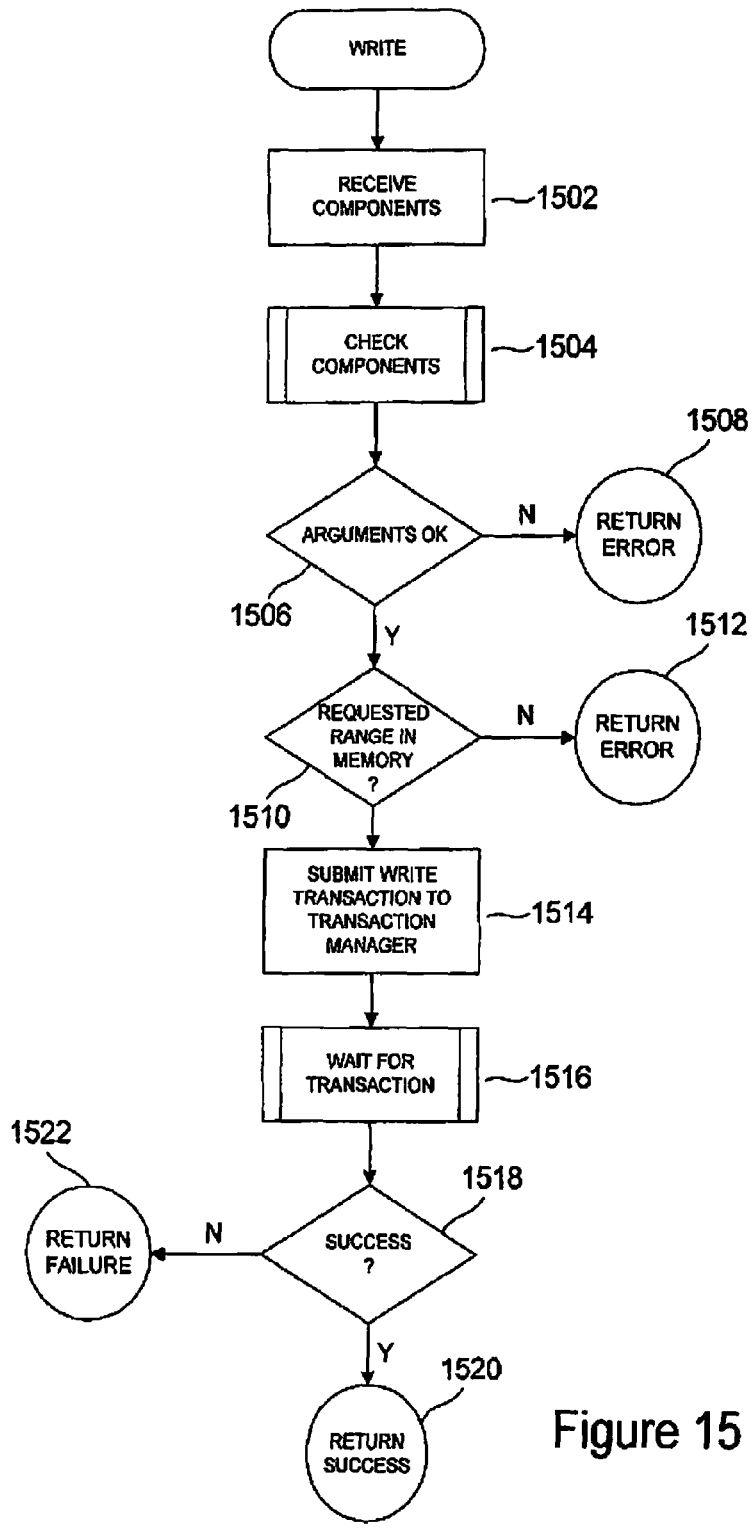
FIG. 15 provides a control-flow diagram for the extended-memory application-program-interface routine "write," according to one embodiment of the present invention.

FIG. 15 provides a control-flow diagram for the extended-memory application-program-interface routine "write," according to one embodiment of the present invention. In step 1502, the routine "write" receives arguments supplied by the calling application program. In step 1504, the routine "write" calls the routine "check arguments," described above with reference to FIG. 14, to check the validity of the argument values. When the argument values cannot be validated, as determined in step 1506, an error is returned in step 1508. Otherwise, in step 1510, the routine "write" determines whether or not the requested window currently resides in the local extended memory, by referring to an entry for the data object in the UDT. When the requested window is not currently in local extended memory, then an error is returned in step 1512. Otherwise, in step 1514, the routine "write" prepares a write transaction and submits the write transaction to the transaction manager. In step 1516, the routine "write" waits for completion of the transaction. When the transaction successfully completes, as determined in step 1518, success is returned in step 1520. Otherwise, failure is returned in step 1522. Note that, as with the above-described routine "read," the routine "write" is assumed to be a synchronous routine. In alternative embodiments of the present invention, asynchronous versions of both the read and write routines are provided, by an extended-memory application-programming interface. In the asynchronous routines, once the transaction is prepared and submitted to the transaction manager, the routines return, after providing for eventual callback by the transaction manager to the application program upon transaction completion.

Figure 16:
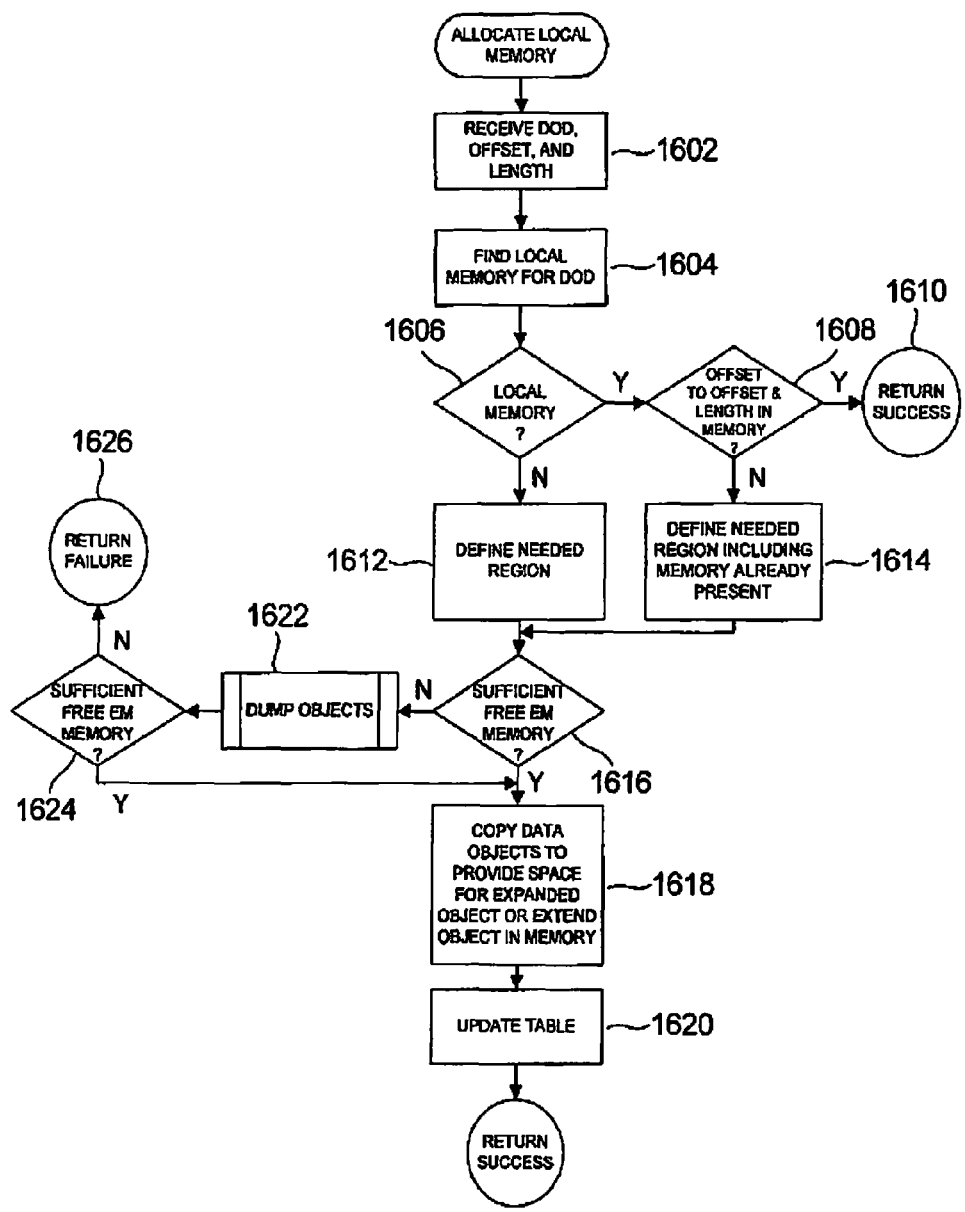
FIG. 16 provides a control-flow diagram for the routine "allocate local memory," called in step 1434 of FIG. 14, according to one embodiment of the present invention.

FIG. 16 provides a control-flow diagram for the routine "allocate local memory," called in step 1434 of FIG. 14, according to one embodiment of the present invention. In step 1602, the routine "allocate local memory" receives DOD, offset, and length arguments. In step 1604, the routine "allocate local memory" accesses the UDT in order to determine whether the data object described by the DOD is currently resident in local extended memory. When the data object currently resides in local extended memory, as determined in step 1606, and when the offset and length arguments describe a region within the data object that currently resides in local memory, as determined in step 1608, success is returned in step 1610. Otherwise, in the case that the data object does not reside in local memory, a local-memory region sufficient to accommodate the window represented by the offset and length is defined in step 1612. When the data object currently resides in local extended memory, but needs to be extended in order to encompass the desired window, the extended portion of the data object is defined in step 1614. Next, in step 1616, the routine "allocate local memory" determines whether there is sufficient free space in local extended memory to accommodate the region defined in either of step 1612 or 1614. When there is sufficient free space in local extended memory to accommodate the region defined in either of step 1612 or 1614, then, in step 1618, the routine "allocate local memory" selects a free space that is currently available for the data object, extends the data object already residing in local memory in order to encompass the window defined by the offset and length arguments, or copies other data objects to other addresses in local extended memory in order to free sufficient space for the data-object window defined by the offset and length arguments. Finally, in step 1620, the UDT is updated to indicate the location of the desired data-object window. When there is insufficient space in local extended memory, as determined in step 1616, the routine "allocate local memory" calls the routine "dump objects," in step 1622, to delete or distribute currently existing data objects in order to free up sufficient memory. When sufficient local extended memory is made available by the call to the routine "dump objects," as determined in step 1624, control flows to step 1618. Otherwise, failure is returned in step 1626.

Figure 17:
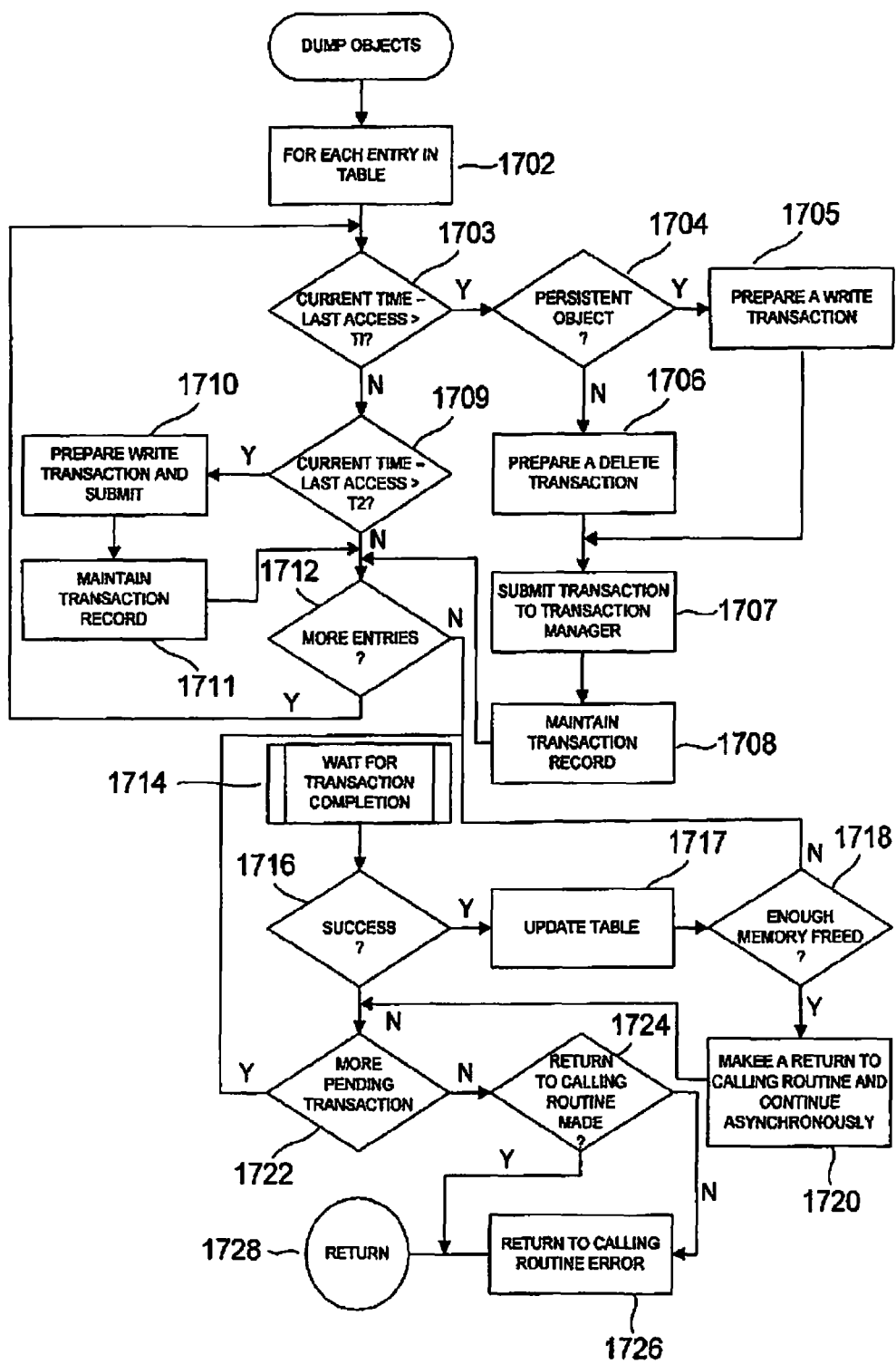
FIG. 17 provides a control-flow diagram for the routine "dump objects," according to one embodiment of the present invention.

FIG. 17 provides a control-flow diagram for the routine "dump objects," according to one embodiment of the present invention. The routine "dump objects" looks through the UDT table and either deletes data objects that haven't been accessed for more than a threshold time or moves large portions of data objects to remote storage. First, in the for-loop comprising steps 1702-1712, the routine "dump objects" traverses the UDT table to select objects for either deletion or re-distribution, and launches write transactions to write the objects, or portions of the objects, to remote storage. For the currently considered entry in the UDT table, the routine "dump objects," in step 1703, determines whether more than a threshold T1 time has elapsed since the last access to the object. In general, the last access is the last operation on the object that required execution of a transaction by the transaction manager. When the last access is greater than the threshold time T1, then, in step 1704, the routine "dump objects" determines whether or not the object is persistently stored. When the object is persistently stored, the routine "dump objects" prepares a write transaction, in step 1705, in order to transfer contents of the data object to remote storage. Otherwise, in step 1706, the routine "dump objects" prepares a delete transaction. Either the write or delete transaction is submitted to the transaction manager, in step 1707, and recorded, in step 1708. Otherwise, in step 1709, the routine "dump objects" determines whether or not a time greater than threshold T2 has elapsed since the last access. In general, threshold T2 is significantly less than threshold T1. When a time greater than threshold T2 has elapsed since the last access, then, in step 1710, a write transaction is prepared and submitted to the transaction manager to write the bulk of the data object back to remote storage, and, in step 1711, the transaction is recorded. The for-loop of steps 1702-1712 continues until there are no more entries in the UDT. In step 1714, the routine "dump objects" waits for transaction completions of the transactions submitted during execution of the for-loop of steps 1702-1712. When the next transaction is completed, the routine "dump objects," in step 1716, determines whether or not the transaction has successfully completed. When the next transaction has successfully completed, the UDT table is updated, in step 1717, to reflect the current state of the object that has either been written back to remote storage and deleted from local extended memory, partitioned and decreased in size in local extended memory, or deleted altogether. When enough memory is now free, as determined in step 1718, to finish the read operation carried out by the read routine instance which called the routine "allocate local memory," which in turn called the routine "dump objects," then, in step 1720, the routine "dump objects" makes a return to the routine "allocate local memory," so that the routine "allocate local memory" can continue execution, while the routine "dump objects" continues to handle many additional transaction completions asynchronously. When the transaction has failed, as determined in step 1716, and when there are more pending transactions, as determined in step 1722, control flows back to step 1714. Otherwise, when no return has yet been made to the calling program, as determined in step 1724, a return call is made, in step 1726, to return an error status to the calling program and, in either case, the routine "dump objects" terminates in step 1728.

The control-flow diagrams and simple extended-memory application-programming interface, described above, illustrate one approach to implementing an extended memory for mobile electronic devices. There are many additional possible implementations, many including more complex routines that implement more complex functionalities. Implementations are not provided, above, for many of the relatively straightforward API routines. For example, the extended memory monitor may monitor launching and termination of application programs within the mobile electronic device in order to automatically restore data objects for the application program, at application-program launch, and automatically write back any persistent data objects from local extended memory to remote data-storage facilities when application programs terminate. In many implementations, as discussed above, transaction processing may operate entirely asynchronously with respect to application programs, so that lengthy data-exchange transactions can continue on an on-going basis during those times that the extended-memory monitor can connect to, and exchange data with, storage facilities. Application programs may further extend control of data-object management to users of mobile electronic devices. For example, an application program may solicit user input as to whether particular data objects should be partitioned between local extended memory and remote storage, persistently stored, stored temporarily for a user-specified period of time, or managed in any of many alternative ways desired by the user. More complex extended-memory systems may allow a user to concurrently access a particular data object from multiple mobile electronic devices, share data objects with users of other mobile electronic devices, store copies of data objects in multiple extended-memory service facilities, and select any of many additional services related to extended memory. Data exchanges can be carried out, by the EM monitor, as background tasks when power and signal allow, even when a user is not currently using the cell phone.

Although the present invention has been described in terms of particular embodiments, it is not intended that the invention be limited to these embodiments. Modifications will be apparent to those skilled in the art. For example, extended memory services for mobile electronic devices may be implemented in any number of different programming languages for execution on any number of different operating systems running within any of many different mobile electronic devices, using different control structures, data structures, and varying other programming parameters. Portions of the extended-memory system may be implemented in logic circuits and firmware, in addition to software. The server side of the extended memory system may be implemented on single server computers, on distributed computing systems, or may be distributed across multiple computer centers and computing systems to provide high levels of fault tolerance, availability, and low-latency access for geographically mobile users.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An extended-memory monitor that executes within an electronic device, the extended-memory monitor comprising:
a session manager that manages communications sessions for command and data exchange through a telecommunications network with one or more remote extended-memory-service applications;
a transaction manager that receives transactions from calling routines, forwards the transactions to the session manager, receives corresponding transaction completions from the session manager, and returns transaction completions to the calling routines; and
extended-memory application-programming-interface routines, linked with application programs, that provide extended-memory data storage to application programs running on the electronic device, an extended memory including a portion of local memory within the electronic device as well as data-storage provided by the one or more remote extended-memory-service applications, the extended-memory application-programming-interface routines submitting transactions to the transaction manager on behalf of calling application programs,
wherein data objects stored in the portion of local memory within the electronic device are transferred from the electronic device to the data-storage provided by the one or more remote extended-memory-service applications at a time when the application programs executing within the electronic device are not currently accessing the data objects and retrieved from the data-storage provided by the one or more remote extended-memory-service applications at a time when the application programs executing within the electronic device again access the data objects.

2. The extended-memory monitor of claim 1 wherein the extended-memory monitor provides for creation, deletion, reading, and writing of extended-memory data objects by application programs, each extended-memory data object identified by a data-object descriptor that uniquely identifies the data object to both the extended-memory monitor and to the one or more remote extended-memory-service applications.

3. The extended-memory monitor of claim 1 wherein the data objects may be stored in local extended memory, on a remote mass-storage device accessible to the one or more remote extended-memory-service applications, or both in local extended memory and on a remote mass-storage device accessible to the one or more remote extended-memory-service applications.

4. The extended-memory monitor of claim 1 wherein portions of data objects stored in the portion of local memory within the electronic device are transferred from the electronic device to the data-storage provided by the one or more remote extended-memory-service applications when application programs executing within the electronic device are not currently accessing the portions of the data objects and retrieved from the data-storage provided by the one or more remote extended-memory-service applications when the application programs executing within the electronic device again access the portions of the data objects.

5. The extended-memory monitor of claim 1 wherein the extended-memory monitor maintains a table of active data objects, each entry of which includes a data-object descriptor, a reference count, and an internal address within the local extended memory at which the data object is currently located.

6. The extended-memory monitor of claim 1 wherein the electronic device is a cell phone.

7. An extended-memory service provided, from a computer system, to one or more remote electronic devices, the extended-memory service comprising:
    a session manager that manages communications sessions for command and data exchange through a telecommunications network with the one or more remote electronic devices;
    a transaction manager that receives transactions from the session manager, forwards the transactions to one or more extended-memory-service applications, receives corresponding transaction completions from the one or more extended-memory-service applications, and returns transaction completions to the session manager, which returns the transaction completions through the telecommunications network to the one or more remote electronic devices; and
    the one or more extended-memory-service applications that store data objects and portions of data objects within the computer system on behalf of the one or more remote electronic devices, allowing data objects and portions of data objects to migrate between the one or more remote electronic devices and the extended-memory service in order to extend local memory resources of the one or more remote electronic devices to include data-storage facilities of the computer system,
    wherein data objects stored in a portion of local memory resources within the one or more remote electronic devices are transferred from the one or more remote electronic devices to a data-storage server accessible to the one or more extended-memory-service applications at a time when application programs executing within the one or more remote electronic devices are not currently accessing the data objects and retrieved from the data-storage server accessible to one or more extended-memory-service applications at a time when the application programs executing within the one or more remote electronic devices again access the data objects.

8. The extended-memory service of claim 7 wherein the extended-memory service facilitates creation, deletion, reading, and writing of extended-memory data objects by application programs running on the one or more remote electronic devices, each extended-memory data object identified by a data-object descriptor that uniquely identifies the data object to both a remote electronic device and to the one or more extended-memory-service applications.

9. The extended-memory service of claim 7 wherein the data objects may be stored in local extended memory within one of the one or more remote electronic devices, in memory or on a mass-storage device within the computer system or on the data-storage server accessible to the one or more extended memory-service applications, or both in local extended memory within one of the one or more remote electronic devices and in memory or on the mass-storage device within the computer system or on the data-storage server accessible to the one or more extended-memory service applications.

10. The extended-memory service of claim 7 wherein portions of data objects stored in the portion of local memory resources within the one or more remote electronic devices are transferred from the one or more remote electronic devices to the data storage server accessible to the one or more extended-memory-service applications when application programs executing within the one or more remote electronic devices are not currently accessing the portions of the data objects and retrieved from the data storage server accessible to the one or more extended-memory-service applications when the application programs executing within the one or more remote electronic devices again access the portions of the data objects.

11. The extended-memory service of claim 7 wherein the one or more extended-memory service applications maintain a table of data objects, each entry of which includes a data-object identifier, a user identifier, and an address within memory or a mass-storage device at which the data object is currently located.

12. The extended-memory service of claim 7 wherein the one or more electronic devices are cell phones.

13. A method of providing an extended-memory service to one or more remote electronic devices, comprising:
    managing, by a computer system, communications sessions for command and data exchange through a telecommunications network with the one or more remote electronic devices;
    receiving, by the computer system, transactions from a session manager;
    forwarding, by the computer system, the transactions to one or more extended-memory-service applications;
    receiving, by the computer system, corresponding transaction completions from the one or more extended-memory-service applications;
    returning, by the computer system, transaction completions to the session manager, which returns the transaction completions through the telecommunications network to the one or more remote electronic devices; and
    storing, by the computer system, data objects and portions of data objects within the computer system on behalf of the one or more remote electronic devices, allowing data objects and portions of data objects to migrate between the one or more remote electronic devices and the extended-memory service in order to extend local memory resources of the one or more remote electronic devices to include data-storage facilities of the computer system, wherein data objects stored in a portion of local memory resources within the one or more remote electronic devices are transferred from the one or more remote electronic devices to a data-storage server accessible to the one or more extended-memory-service applications at a time when application programs executing within the one or more remote electronic devices are not currently accessing the data objects and retrieved from the data-storage server accessible to one or more extended-memory-service applications at a time when the application programs executing within the one or more remote electronic devices again access the data objects.

14. The method of claim 13, further comprising facilitating, by the computer system, creation, deletion, reading, and writing of extended-memory data objects by application programs running on the one or more remote electronic devices, each extended-memory data object identified by a data-object descriptor that uniquely identifies the data object to both a remote electronic device and to the one or more extended-memory-service applications.

15. The method of claim 13, wherein the data objects may be stored in local extended memory within one of the one or more remote electronic devices, in memory or on a mass-storage device within the computer system or on the data-storage server accessible to the one or more extended-memory-service applications, or both in local extended memory within one of the one or more remote electronic devices and in memory or on the mass-storage device within the computer system or on the data-storage server accessible to the one or more extended-memory service applications.

16. The method of claim 13, wherein portions of data objects stored in the portion of local memory resources within the one or more remote electronic devices are transferred from the one or more remote electronic devices to the data storage server accessible to the one or more extended-memory-service applications when application programs executing within the one or more remote electronic devices are not currently accessing the portions of the data objects and retrieved from the data storage server accessible to the one or more extended-memory-service applications when the application programs executing within the one or more remote electronic devices again access the portions of the data objects.

17. The method of claim 13, wherein the one or more extended-memory service applications maintain a table of data objects, each entry of which includes a data-object identifier, a user identifier, and an address within memory or a mass-storage device at which the data object is currently located.

18. The method of claim 13, wherein the one or more electronic devices are cell phones.

* * * * *